US009288230B2

(12) United States Patent  
Ahmavaara et al.

(10) Patent No.: US 9,288,230 B2  
(45) Date of Patent: Mar. 15, 2016

(54) METHODS AND APPARATUS FOR PROVIDING OR RECEIVING DATA CONNECTIVITY

(75) Inventors: Kalle Ahmavaara, San Diego, CA (US); Jatinkumar Chandrakant Kadakia, San Diego, CA (US); Michael Vernon Warlick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 898 days.

(21) Appl. No.: 13/316,539

(22) Filed: Dec. 11, 2011

(65) Prior Publication Data

US 2012/0158829 A1    Jun. 21, 2012

Related U.S. Application Data

(60) Provisional application No. 61/425,230, filed on Dec. 20, 2010.

(51) Int. Cl.
```
G06F 15/16    (2006.01)
H04L 29/06    (2006.01)
H04W 12/08    (2009.01)
H04W 88/16    (2009.01)
```
(52) U.S. Cl.
CPC ............. *H04L 63/20* (2013.01); *H04L 63/101* (2013.01); *H04L 63/102* (2013.01); *H04W 12/08* (2013.01); *H04M 2215/0192* (2013.01); *H04W 88/16* (2013.01)

(58) Field of Classification Search
CPC ..... H04L 63/101; H04L 63/102; H04L 63/20; H04W 12/08; H04W 88/16; H04M 2215/0192; G06F 15/16

USPC .................................................. 709/203, 200  
See application file for complete search history.

(56) References Cited

U.S. PATENT DOCUMENTS

| | | | | |
|---|---|---|---|---|
| 5,774,869 A * | 6/1998 | Toader | ................... | G06Q 20/04 705/14.14 |
| 5,806,043 A * | 9/1998 | Toader | ................... | G06Q 20/04 405/14 |
| 5,987,611 A | 11/1999 | Freund | | |
| 6,397,246 B1 * | 5/2002 | Wolfe | ............... | G06F 17/30902 707/E17.12 |
| 6,473,768 B1 * | 10/2002 | Srivastava | ................. | G06F 8/67 |
| 6,571,221 B1 * | 5/2003 | Stewart | ................... | H04L 12/14 705/52 |

(Continued)

FOREIGN PATENT DOCUMENTS

| | | |
|---|---|---|
| CN | 1567266 A | 1/2005 |
| CN | 101094225 A | 12/2007 |

(Continued)

OTHER PUBLICATIONS

International Search Report and Written Opinion—PCT/US2011/065699—ISA/EPO—Feb. 16, 2012.

*Primary Examiner* — Anthony Mejia

(57) ABSTRACT

Methods and apparatus for providing or receiving data connectivity with an access network may include receiving or transmitting a request from a wireless device for data connectivity to a destination. The destination may be associated with use of an application. The methods and apparatus may further include determining whether the destination is a sponsored destination. The methods and apparatus may further include providing or receiving sponsored data connectivity via the access network from the wireless device to the sponsored destination for use of the application on the wireless device if the destination is a sponsored destination.

62 Claims, 13 Drawing Sheets

(56) References Cited

U.S. PATENT DOCUMENTS

| | | | |
|---|---|---|---|
| 6,983,311 B1* | 1/2006 | Haitsuka | G06Q 10/02 705/14.54 |
| 7,043,225 B1 | 5/2006 | Patel et al. | |
| 7,089,194 B1 | 8/2006 | Berstis et al. | |
| 7,089,304 B2* | 8/2006 | Graham | H04L 12/2602 709/203 |
| 7,130,807 B1 | 10/2006 | Mikurak | |
| 7,382,879 B1 | 6/2008 | Miller | |
| 7,392,531 B2* | 6/2008 | Thurston | H04N 7/165 348/E7.063 |
| 7,433,311 B1 | 10/2008 | Kalyanasundaram et al. | |
| 7,437,449 B1 | 10/2008 | Monga et al. | |
| 7,580,701 B2 | 8/2009 | Ross et al. | |
| 7,821,984 B2* | 10/2010 | Wilson | H04B 7/18582 370/328 |
| 8,190,708 B1* | 5/2012 | Short | H04L 12/14 709/219 |
| 8,606,704 B2* | 12/2013 | Roberts | G06Q 20/123 705/40 |
| 8,693,358 B2* | 4/2014 | Hodges | 370/252 |
| 8,831,517 B2* | 9/2014 | Shankaranarayanan | H04L 12/1475 455/11.1 |
| 8,869,235 B2* | 10/2014 | Qureshi | H04L 63/20 713/150 |
| 2002/0032609 A1* | 3/2002 | Wilkman | G06Q 30/02 705/14.1 |
| 2002/0066033 A1 | 5/2002 | Dobbins et al. | |
| 2002/0078059 A1* | 6/2002 | Urera | G06F 21/31 |
| 2002/0095311 A1 | 7/2002 | Donahue | |
| 2002/0103879 A1* | 8/2002 | Mondragon | G06Q 30/02 709/218 |
| 2002/0107697 A1 | 8/2002 | Jensen | |
| 2002/0147784 A1 | 10/2002 | Gold et al. | |
| 2003/0083988 A1* | 5/2003 | Reith | G06Q 20/102 705/40 |
| 2003/0152039 A1 | 8/2003 | Roberts | |
| 2003/0177207 A1* | 9/2003 | Nagasaka | G06Q 30/02 709/220 |
| 2003/0208695 A1* | 11/2003 | Soto | H04L 63/083 726/15 |
| 2004/0019675 A1* | 1/2004 | Hebeler, Jr. | G06Q 10/00 709/224 |
| 2004/0030887 A1* | 2/2004 | Harrisville-Wolff | H04L 63/0442 713/155 |
| 2004/0083125 A1* | 4/2004 | Almeida et al. | G06Q 10/10 705/4 |
| 2004/0225561 A1 | 11/2004 | Hertzberg et al. | |
| 2005/0060425 A1 | 3/2005 | Yeh et al. | |
| 2005/0165646 A1 | 7/2005 | Tedesco et al. | |
| 2005/0177506 A1* | 8/2005 | Rissanen | G06Q 20/102 705/40 |
| 2006/0023855 A1* | 2/2006 | Park | H04W 4/24 379/114.1 |
| 2006/0206422 A1 | 9/2006 | Mashinsky | |
| 2006/0245414 A1 | 11/2006 | Susai et al. | |
| 2006/0259628 A1 | 11/2006 | Vadlapudi et al. | |
| 2007/0041536 A1* | 2/2007 | Koskinen | H04M 15/31 379/114.28 |
| 2007/0072678 A1 | 3/2007 | Dagres | |
| 2007/0150388 A1* | 6/2007 | Mendiratta | G06Q 30/00 705/35 |
| 2007/0180449 A1 | 8/2007 | Croft et al. | |
| 2007/0183400 A1 | 8/2007 | Bennett et al. | |
| 2007/0209061 A1* | 9/2007 | Dekeyzer | H04L 29/12009 726/3 |
| 2007/0282965 A1 | 12/2007 | Kataoka | |
| 2008/0071914 A1 | 3/2008 | Kimura et al. | |
| 2008/0240091 A1 | 10/2008 | Kesavan et al. | |
| 2008/0287096 A1* | 11/2008 | Aaltonen | G06F 17/30864 455/406 |
| 2008/0297481 A1* | 12/2008 | Higginson | G06Q 20/123 345/169 |
| 2008/0299989 A1* | 12/2008 | King | G01S 5/02 455/456.1 |
| 2009/0234714 A1 | 9/2009 | Bolotin et al. | |
| 2010/0004959 A1* | 1/2010 | Weingrad | G06Q 20/123 345/169 |
| 2010/0008337 A1* | 1/2010 | Bajko | H04W 4/043 370/338 |
| 2010/0042478 A1* | 2/2010 | Reisman | G06F 8/65 709/227 |
| 2010/0081461 A1 | 4/2010 | Bothra et al. | |
| 2010/0100453 A1 | 4/2010 | Van Rensburg | |
| 2010/0115113 A1* | 5/2010 | Short | H04L 63/08 709/228 |
| 2010/0128667 A1 | 5/2010 | Russell | |
| 2010/0153228 A1 | 6/2010 | Ahmavaara | |
| 2010/0177663 A1 | 7/2010 | Johansson et al. | |
| 2010/0192207 A1* | 7/2010 | Raleigh | G06Q 10/06375 726/6 |
| 2010/0197268 A1 | 8/2010 | Raleigh | |
| 2010/0198698 A1 | 8/2010 | Raleigh et al. | |
| 2010/0205099 A1 | 8/2010 | Ahmavaara et al. | |
| 2010/0223096 A1 | 9/2010 | Bosan et al. | |
| 2010/0235233 A1* | 9/2010 | Goldberg | H04N 21/8586 705/14.45 |
| 2011/0107362 A1* | 5/2011 | Reilly | H04N 7/17318 725/23 |
| 2011/0178863 A1* | 7/2011 | Daigle | G06Q 30/0231 705/14.31 |
| 2011/0215949 A1* | 9/2011 | Yarnold | G08G 1/205 340/989 |
| 2012/0079423 A1* | 3/2012 | Bender | G06F 9/44505 715/804 |
| 2012/0144050 A1* | 6/2012 | Shah | H04L 63/083 709/229 |
| 2012/0155380 A1* | 6/2012 | Hodges | G06Q 30/00 370/328 |
| 2012/0184282 A1* | 7/2012 | Malkamaki | H04W 48/14 455/450 |
| 2013/0117805 A1* | 5/2013 | Kent | H04L 63/205 726/1 |
| 2013/0132854 A1* | 5/2013 | Raleigh et al. | 715/738 |
| 2014/0007222 A1* | 1/2014 | Qureshi | G06F 21/10 726/16 |
| 2014/0279454 A1* | 9/2014 | Raman | H04L 63/08 705/40 |
| 2014/0337528 A1* | 11/2014 | Barton | H04L 63/10 709/225 |

FOREIGN PATENT DOCUMENTS

| | | |
|---|---|---|
| CN | 101184014 A | 5/2008 |
| CN | 101282336 A | 10/2008 |
| EP | 1043869 A2 | 10/2000 |
| EP | 1246445 A1 | 10/2002 |
| JP | 2000253070 A | 9/2000 |
| JP | 2000332750 A | 11/2000 |
| JP | 2001285337 A | 10/2001 |
| JP | 2003526273 A | 9/2003 |
| JP | 2004032423 A | 1/2004 |
| JP | 2004046420 A | 2/2004 |
| JP | 2005136627 A | 5/2005 |
| JP | 2006054841 A | 2/2006 |
| JP | 2006303751 A | 11/2006 |
| JP | 2007323115 A | 12/2007 |
| JP | 2008078878 A | 4/2008 |
| JP | 2010508738 A | 3/2010 |
| JP | 2013541278 A | 11/2013 |
| RU | 2297663 C2 | 4/2007 |
| WO | WO0117183 | 3/2001 |
| WO | 0167669 A2 | 9/2001 |
| WO | 03046742 A1 | 6/2003 |
| WO | WO-2005027387 A2 | 3/2005 |
| WO | 2008007039 A1 | 1/2008 |
| WO | 2008055541 A1 | 5/2008 |
| WO | WO-2008075154 A2 | 6/2008 |
| WO | WO-2012034080 A1 | 3/2012 |

* cited by examiner

METHODS AND APPARATUS FOR PROVIDING OR RECEIVING DATA CONNECTIVITY

CLAIM OF PRIORITY UNDER 35 U.S.C. §119

The present Application for patent claims priority to U.S. Provisional Application No. 61/425,230 entitled "Methods and Apparatus for Providing Data Connectivity" filed Dec. 20, 2010, and assigned to the assignee hereof and hereby expressly incorporated by reference herein.

BACKGROUND

In today's world, wireless communication systems are widely deployed to provide various types of content, including voice, video, music, text and data, for example. Wireless devices, such as cellular telephones or handheld devices having wireless connection capability are deployed leveraging the wireless communication system by users for communicating and interacting with each other.

Typically when a user connects a wireless device to a wireless communication system, the wireless device uses predetermined credentials and subscription data, such as a connectivity agreement or subscription plan, for accessing the wireless communication system. The subscription plan generally limits the wireless access to a particular communication system. If the particular communication system is not in the location where the wireless device wants to access a wireless network, the user of the wireless device may have to pay an additional charge to gain access to the communication system. Moreover, if the user of the wireless device does not have a data connection plan, then the user may not have access to the communication system.

Service providers, however, may want to provide users with access to the communication system for accessing the services and/or applications provided by the service provider, even if the user does not have a data connectivity plan for accessing the communication system. Therefore, there is a need for methods and systems which provide sponsored data connectivity to a user of the wireless device for accessing a communication system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for providing data connectivity with an access network. The method may include receiving a request from a wireless device for data connectivity to a destination, wherein the destination is associated with use of an application on the wireless device. The method may also include determining whether the destination is a sponsored destination. In addition, the method may include enabling sponsored data connectivity via the access network from the wireless device to the sponsored destination for use of the application on the wireless device when the destination is the sponsored destination.

Another aspect relates to at least one processor configured to provide data connectivity with an access network. The processor may include a first module for receiving a request from a wireless device for data connectivity to a destination, wherein the destination is associated with use of an application on the wireless device. The processor may further include a second module for determining whether the destination is a sponsored destination. The processor may additionally include a third module for enabling sponsored data connectivity via the access network from the wireless device to the sponsored destination for use of the application on the wireless device when the destination is the sponsored destination.

Yet another aspect relates to a computer program product. The computer program product may include a computer-readable medium including at least one instruction for causing a computer to receive a request from a wireless device for data connectivity to a destination, wherein the destination is associated with use of an application on the wireless device. The computer-readable medium may also include at least one instruction for causing the computer to determine whether the destination is a sponsored destination. The computer-readable medium may further include at least one instruction for causing the computer to enable sponsored data connectivity via the access network from the wireless device to the sponsored destination for use of the application on the wireless device when the destination is the sponsored destination.

Another aspect relates to an apparatus. The apparatus may include means for receiving a request from a wireless device for data connectivity to a destination, wherein the destination is associated with use of an application on the wireless device. In addition, the apparatus may include means for determining whether the destination is a sponsored destination. Moreover, the apparatus may include means for enabling sponsored data connectivity via the access network from the wireless device to the sponsored destination for use of the application on the wireless device when the destination is the sponsored destination.

Yet another aspect relates to an apparatus for providing data connectivity with an access network. The apparatus may include a data connection component capable of receiving a request from a wireless device for data connectivity to a destination, wherein the destination is associated with use of an application on the wireless device. The apparatus may also include an access component capable of determining whether the destination is a sponsored destination, wherein the access component is further capable of enabling sponsored data connectivity via the access network from the wireless device to the sponsored destination for use of the application on the wireless device when the destination is the sponsored destination.

Another aspect relates to a method for requesting data connectivity. The method may include sending a request for data connectivity to a data connection managing component, wherein the request identifies a destination associated with use of an application. The method may also include establishing a data connection for accessing the destination in response to the request, wherein when the destination is determined to be a sponsored destination, the data connection comprises a sponsored data connection to the destination for use with the application. In addition, the method may include accessing the destination using the data connection.

Still another aspect relates to at least one processor configured to request data connectivity. The processor may include a first module for sending a request for data connectivity to a data connection managing component, wherein the request identifies a destination associated with use of an application. The processor may further include a second module for establishing a data connection for accessing the destination in response to the request, wherein when the destination is determined to be a sponsored destination, the data connection comprises a sponsored data connection to the destination for use with the application. Moreover, the processor may include a third module for accessing the destination using the data connection.

Another aspect relates to a computer program product. The computer program product may include a computer-readable medium including at least one instruction for causing a computer to send a request for data connectivity to a data connection managing component, wherein the request identifies a destination associated with use of an application. The computer-readable medium may also include at least one instruction for causing the computer to establish a data connection for accessing the destination in response to the request, wherein when the destination is determined to be a sponsored destination, the data connection comprises a sponsored data connection to the destination for use with the application. The computer-readable medium may further include at least one instruction for causing the computer to access the destination using the data connection.

Yet another aspect relates to an apparatus. The apparatus may include means for sending a request for data connectivity to a data connection managing component, wherein the request identifies a destination associated with use of an application. The apparatus may further include means for establishing a data connection for accessing the destination in response to the request, wherein when the destination is determined to be a sponsored destination, the data connection comprises a sponsored data connection to the destination for use with the application. In addition, the apparatus may include means for accessing the destination using the data connection.

Another aspect relates to an apparatus for requesting data connectivity. The apparatus may include a requestor component capable of sending a request for data connectivity to a data connection managing component, wherein the request identifies a destination associated with use of an application. The apparatus may further include an access component capable of establishing a data connection for accessing the destination in response to the request, wherein when the destination is determined to be a sponsored destination, the data connection comprises a sponsored data connection to the destination for use with the application. The apparatus may also include the access component being further capable of accessing the destination using the data connection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and systems for providing or receiving sponsored data connectivity with an access network for use with one or more applications on a wireless device. The described methods and systems transmit or receive a request for data connectivity between a wireless device and a destination. The destination may include a destination address that may be associated with the use of an application on the wireless device.

The described methods and systems may further determine whether the destination is a sponsored destination which provides sponsored data connectivity to an access network for use with the application. The term "sponsored data activity" may include, but is not limited to, a connection that is free of charge or partially paid for by a third party, e.g., a party other than the user of the device that transmitted the request. In an aspect, for example, the third party may be an entity associated with the destination, for instance, the owner of a website that wants to encourage use of the website by providing the sponsored data activity. Accordingly, the third party associated with the destination may pay for all or a portion of the data connectivity to the access network instead of the user of the wireless device paying for all of the data connectivity. Thus, the described methods and systems allow a user of a wireless device to request data connectivity for use with one or more applications and receive sponsored data connectivity for use with requested applications from one or more third parties.

Figure 1:
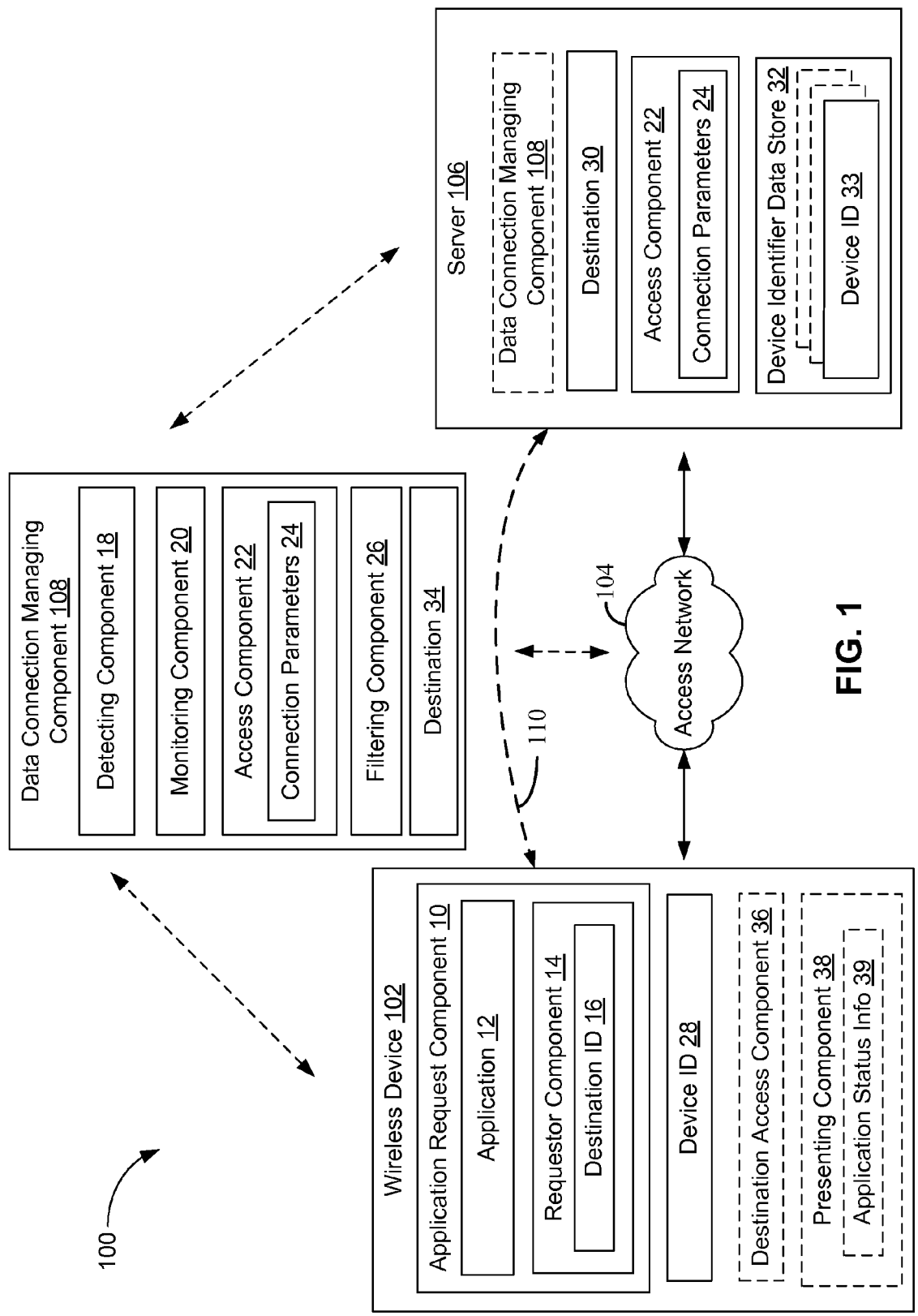
FIG. 1 illustrates an example connectivity system in accordance with an aspect.

Referring now to FIG. 1, illustrated is an example connectivity system 100 that may include one or more wireless devices 102 communicating through one or more access networks 104 with one or more servers and/or computing devices 106. Wireless device 102 may include any mobile or portable computing or communications device, such as a cellular device, that may connect to an access network 104. Wireless device 102 may be, for example, a cellular telephone, a netbook, a notebook, a tablet, a smartbook, a navigation system, a computing device, a camera, a PDA, a music device, a gaming device or a handheld device having wireless connection capability, and/or other wireless devices. Server/computing device 106 may include any mobile or fixed computing device connected to a network. Server/computing device 106 may include, but is not limited to, a computing device, a server, a cellular telephone, a camera, a PDA, a music device, a gaming device, a navigation system, a handheld device having wireless connection capability, and/or other devices. Furthermore, access network 104 may provide one or more types of communication connections, such as any type of wireless airlink, to wireless device 102 and server 106. Wireless device 102 may place and/or receive a communication, e.g., a telephone call, a video conferencing call, an Internet Protocol session, such as a SKYPE™ session, a voice over internet protocol (IP) call, a short message service (SMS) message, a multimedia messaging service (MMS) message, an instant messaging (IM) service message, a chat or net-meeting related connection, a video, music, data transfer, and/or other communications, via access network 104 to one or more servers 106. In addition, wireless device 102 may receive a communication via access network 104 from one or more servers 106, or from any other device in communication with access network 104.

Wireless device 102 may include an application request component 10 operable for requesting data connectivity from a destination 30, 34 for use with one or more applications 12 by wireless device 102. Applications 12 may include, but are not limited to, social networking applications, messaging applications, network browsing applications, communication applications, sports applications, entertainment applications, shopping applications, electronic book applications, news applications, music applications, game applications, and/or other applications. The one or more applications 12 selected by a user may be stored on wireless device 102, for instance, in memory and/or other suitable storage device of the wireless device 102. In addition and/or alternatively, the one or more applications 12 may not be stored on wireless device 102 but may be accessed at the destination 30, 34. For example, a user of wireless device 102 may enter in the destination for an application, such as, a website address for a shopping application, and receive access to the application at the entered destination. Application request component 10 may include a requestor component 14 operable for sending a request for data connectivity, via access network 104, to the destination 30, 34 associated with destination identifier (ID) 16. Destination ID 16 may be, for example, an internet protocol (IP) address of a location, a name of a location, and/or other destination identifiers.

In one aspect, destination ID 16 may be associated with destination 30 of server 106. For example, the application request component 10 may send a request to server 106 via access network 104 for data connectivity provided by server 106. Server 106 may have an access component 22 operable for providing data connectivity to access network 104 for use with the requested application 12. Access component 22 may have connection parameters 24 which define the data connectivity available for accessing access network 104. Data connectivity may include, but is not limited to, sponsored data connectivity to access network 104 for use with application 12, the user's service provider plan for accessing access network 104, a WiFi connection, or an Ethernet connection, an amount of data (e.g., the number of bytes) capable of being exchanged, a number of users capable of using the data connectivity, an amount of data exchange per user (e.g., 10 megabytes per user), a number of times of using the data connectivity, time period during which the data connectivity is available (e.g., the time of day), and/or other forms of data connectivity.

Figure 4:
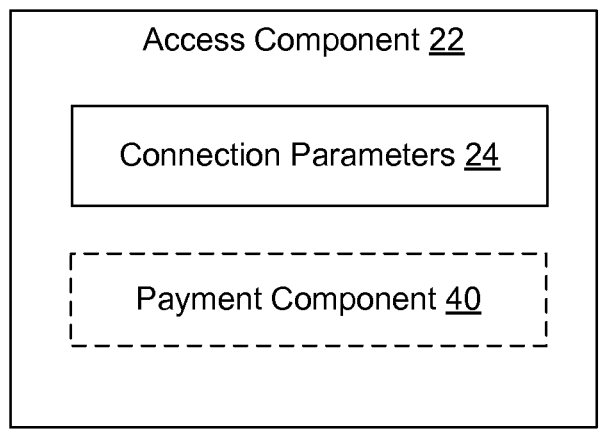
FIG. 4 illustrates an example access component operable within the connectivity system in accordance yet another aspect.

In addition, access component 22 may optionally include a payment component 40, as shown in FIG. 4, which may be operable to receive and/or generate payments for the provided data connectivity. For example, a third party, not the user, may provide the payment to the payment component 40 for accessing access network 104 via the sponsored data connectivity. Payment between the third party and the access network may be based upon, but not limited to, a bulk rate arrangement, a charge per mega byte, or any other payment agreement between the third party and access network. It should be appreciated, however, that the user may pay for the portions of the data connectivity not sponsored by the third party and/or may pay for the data connectivity when the sponsored data connectivity expires and/or runs out.

In addition, as shown in FIG. 1, server 106 may determine whether to provide data connectivity for use with application 12 to wireless device 102 in response to the request. In an aspect, server 106 may interact with a data repository, such as device identifier data store 32 having a list of device identifiers 33 that identify the devices for which the server 106 will provide sponsored data connectivity. For example, server 106 may compare the device identifier (ID) 28 of wireless device 102 with the list of device identifiers 33 in device identifier data store 32 to determine whether wireless device 102 is among the devices for which server 106 will provide sponsored data connectivity. In another aspect, server 106 may use device ID 28 to validate wireless device 102 to ensure that the request for data connectivity comes from a valid source. In another aspect, server 106 may provide data connectivity to all wireless devices that request data connectivity for use with application 12. For example, in a case where server 106 provides data connectivity for use with a shopping application, then server 106 may want to provide data connectivity for all requests from the respective shopping application on any device in order to encourage more users to purchase items using the shopping application. In yet another aspect, server 106 may register the user of wireless device 102, e.g., create a user name and password, with server 106 before server 106 provides the requested data connectivity for use with application 12. In yet another aspect, server 106 may interact with a device identifier data store 32 with a list of identifiers 33, which identify the entities for which the server 106 will provide sponsored data connectivity. The entities may be, e.g., the application subscribers that are entitled for sponsored data connectivity service. Therefore, it should be appreciated that server 106 may have the discretion whether to provide sponsorship for the requested data connectivity from the application request component 10 for use with application 12.

Destination ID 16 may also be associated with a data connection managing component 108 operable for receiving a request for data connectivity from a destination 30 associated with server 106. In addition, the data managing component 108 may be further operable to determine whether the requested destination 30 is a sponsored destination which provides sponsored data connectivity to access network 104. In an aspect, the data managing component 108 may be part of server 106. It should be appreciated, however, that the data managing component 108 may be part of the access network 104, the wireless device 102, and/or a separate entity in communication with the wireless device 102, the access network 104, and/or the server 106. As such, determining whether the requested destination 30 is a sponsored destination may occur at access network 104 and/or at a separate entity in communication with access network 104. For example, access network 104 and/or data connection managing component 108 may forward the requested destination 30 to a separate entity (which may be a remotely located data connection managing component 108 and/or server 106) to determine whether the requested destination 30 is a sponsored destination and may receive a response from the separate entity, where the response indicates whether the destination is a sponsored destination, in order to determine whether the requested destination 30 is a sponsored destination.

Data managing component 108 may include a detecting component 18 operable to detect whether the destination 30 provides sponsored data connectivity to access network 104 for use with requested application 12. When the destination 30 is a sponsored destination, data managing component 108 and/or access network 104 may forward the request for data connectivity to the server 106. For example, detecting component 18 may compare the device identifier (ID) 28 of wireless device 102 with the list of device identifiers to determine whether wireless device 102 is among the devices to which server 106 will provide sponsored data connectivity. In another aspect, server 106 may use device ID 28 to validate wireless device 102 to ensure that the request for data connectivity comes from a valid source. In yet another aspect, server 106 may use a further server to validate the requestor's entitlement for the sponsored data connectivity.

In another aspect, when the destination 30 is a sponsored destination, data managing component 108 may have an access component 22 which may enable the sponsored data connectivity to access network 104. In one aspect, the access network may provide the sponsored data connectivity to access component 22. In another aspect, a separate entity in communication with access network 104 and/or the server 106 may provide the sponsored data connectivity to access component 22. Access component 22 may use connection parameters 24 associated with the sponsored data connectivity when enabling the sponsored data connectivity to wireless device 102 for use with application 12. Connection parameters 24 may define the connection threshold for the sponsored data connectivity provided to access network 104 via the destination 30. For example, the connection threshold may include, but is not limited to, an amount of data (e.g., the number of bytes) capable of being exchanged using the sponsored data connectivity, a number of users capable of using the sponsored data connectivity, an amount of data exchange per user (e.g., 10 megabytes per user), a number of times of using the sponsored data connectivity, a time period during which the sponsored data connectivity is available (e.g., the time of day), and/or other connection parameters.

Figure 3:
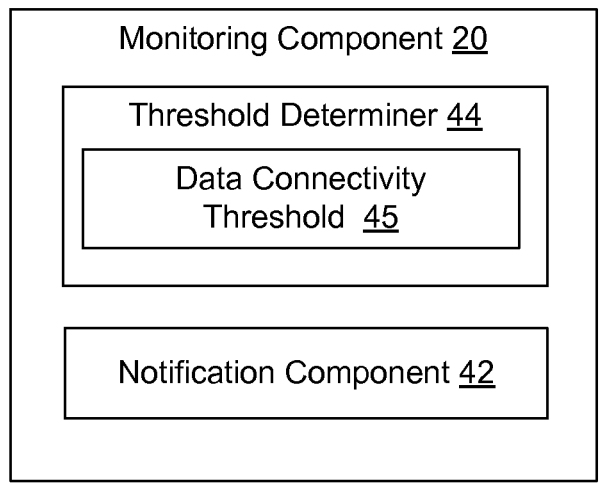
FIG. 3 illustrates an example monitoring component operable within the connectivity system in accordance with another aspect.

Data connection managing component 108 may also include a monitoring component 20 operable to monitor and/or track the data traffic using the sponsored data connectivity. The monitoring component 20 may further be operable to meter the data flow over the sponsored data connectivity. For example, the monitoring component 20 may have a threshold determiner component 44 (FIG. 3) that monitors the data traffic and determines when the data traffic exceeds a data connectivity threshold 45, e.g., a limit on the amount of sponsored data connectivity provided by the destination 30 to the access network. The monitoring component 20 may communicate with a filtering component 26 to limit the data traffic using the sponsored data connectivity. Filtering component 26 may be operable to allow and/or prevent data traffic from using the sponsored data connectivity. Thus, when the data traffic exceeds the data connectivity threshold 45, filtering component 26 may limit the data traffic using the sponsored data connectivity.

In an aspect, monitoring component 20 may also include a notification component 42 (FIG. 3) operable to send one or more notifications to a user of wireless device 102. The notifications may include, for example, application status information that notifies the user whether sponsored data connectivity is available for the applications, an amount of data remaining for the sponsored data connectivity, and/or an available quota for the sponsored data connectivity. In addition, the notifications may notify the user that the sponsored data connectivity is expiring and/or has expired. When the data connectivity expires, the notifications may also prompt the user to purchase data connectivity for accessing the access network for the application. It should be noted that the above are representative examples of the type of notifications that may be forwarded by notification component 42.

It should be appreciated that wireless device 102 may communicate with one or more data connection managing components 108 to receive one or more sponsored data connections from one or more destinations. For example, in an aspect, wireless device 102 may include a destination access component 36 for accessing one or more destinations using the received one or more sponsored data connections. In an aspect, destination access component 36 may include a communication component, or a communication interface, capable of communicating with data connection managing component 108 and/or access network 104. For example, an application 12 that is sponsored may interact with destination access component 36 to establish a data connection via access network 104 to destination 30. Thus, wireless device 102 may have access to one or more applications via the one or more sponsored destinations.

In addition, wireless device 102 may have a presenting component 38 operable to receive and present application status information 39. For example, the presenting component 38 may receive the application status information 39 from server 106 regarding one or more available applications and/or services for use on the wireless device and present the received application status information 39 to a user of the wireless device. The application status information 39 may include, but is not limited to, whether sponsored data connectivity is available for the applications, an amount of data remaining for the sponsored data connectivity, and/or an available quota for the sponsored data connectivity. It should be appreciated that the presenting component 38 may receive and present a variety of information and/or notifications associated with one or more applications and/or services.

Figure 2:
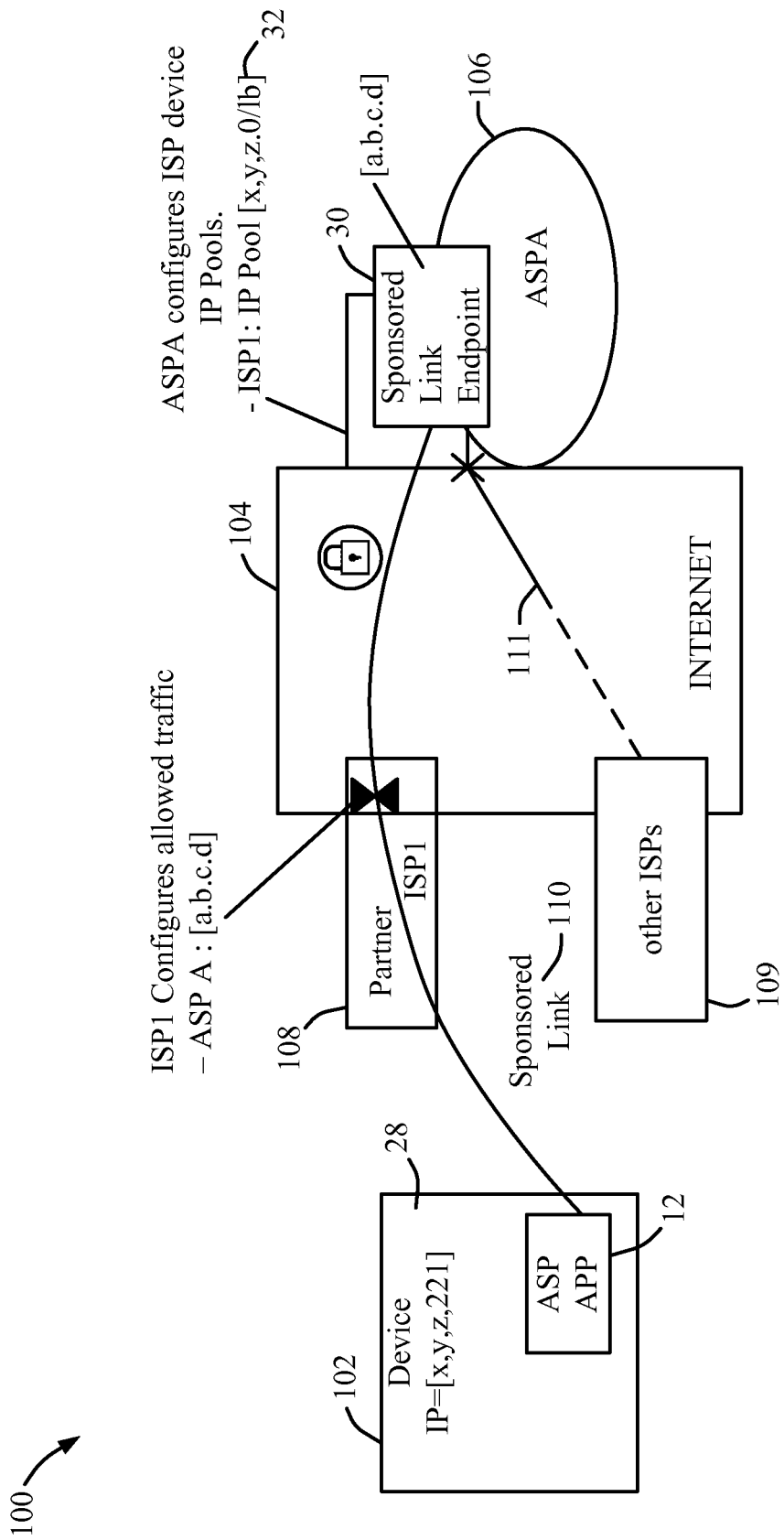
FIG. 2 illustrates an example connectivity system in accordance with another aspect.

In one use case connectivity system 100 may be implemented with internet service providers (ISPs) and application service providers (ASPs), as illustrated in FIG. 2. For instance, in one aspect, a data connection managing component 108 may be an internet service provider, such as internet service provider ISP 1, and may establish a sponsored connection or link 110 to destination 30, such as a sponsored link endpoint, for application 12 associated with a server 106 of an ASP A. Thus, wireless device 102 may not have a data plan, but wireless device 102 can still obtain services from destination 30 based on the server 106 of the ASP A or another third party sponsoring the connection link 110.

In an aspect, wireless device 102 may execute application 12 associated with the server 106 of the ASP A. Wireless device 102 may send a request for data connectivity with the server 106 of the ASP A to ISP 108. The request may include wireless device identifier (ID) 28 (e.g., [x.y.z.221]) and the address for destination 30 (e.g., [a.b.c.d]). ISP 108 may determine that destination 30 is a sponsored endpoint and forward the request to the server 106 of the ASP A. For example, ISP 108 may compare the address for destination 30 with a list of sponsored endpoint addresses. When a match occurs, ISP 108 may determine that destination 30 is a sponsored endpoint and forward the request to the server 106 of the ASP A.

In one aspect, such as in a limited access scenario, the server 106 of the ASP A may compare the received wireless device ID 28 with a list of device identifiers 33 in device identifier data store 32. If wireless device ID 28 matches to an identifier on the list of device identifiers 33, the server 106 of the ASP A may provide access information to ISP 108 to establish sponsored link 110. Wireless device may use the sponsored link 110 to establish a data connection with destination 30 and access destination 30 for use of application 12. In other aspects, the server 106 of the ASP A may provide access information to any device.

ISP 108 may have a filtering component 26 that may detect, allow, and meter the traversing traffic for each sponsored link 110. Thus, ISP 108 may be an intermediary component that controls which wireless devices are allowed to maintain connections using the sponsored link 110 and how much data may be sent via the sponsored link 110.

In an aspect, destination 30 may only be accessible to one or more specific access nodes, such as network nodes participating in the system described herein, which may include a node such as ISP 108. For instance, one or more other non-participating ISPs 109 may not be able to establish a connection (as shown by reference 111). Therefore, data connection managing component 108 may act as a proxy server through which one or more applications exchange all sponsored traffic. It will be appreciated, however, that all sponsored traffic need not be sent through a single network node or a specific set of access nodes.

Figure 5:
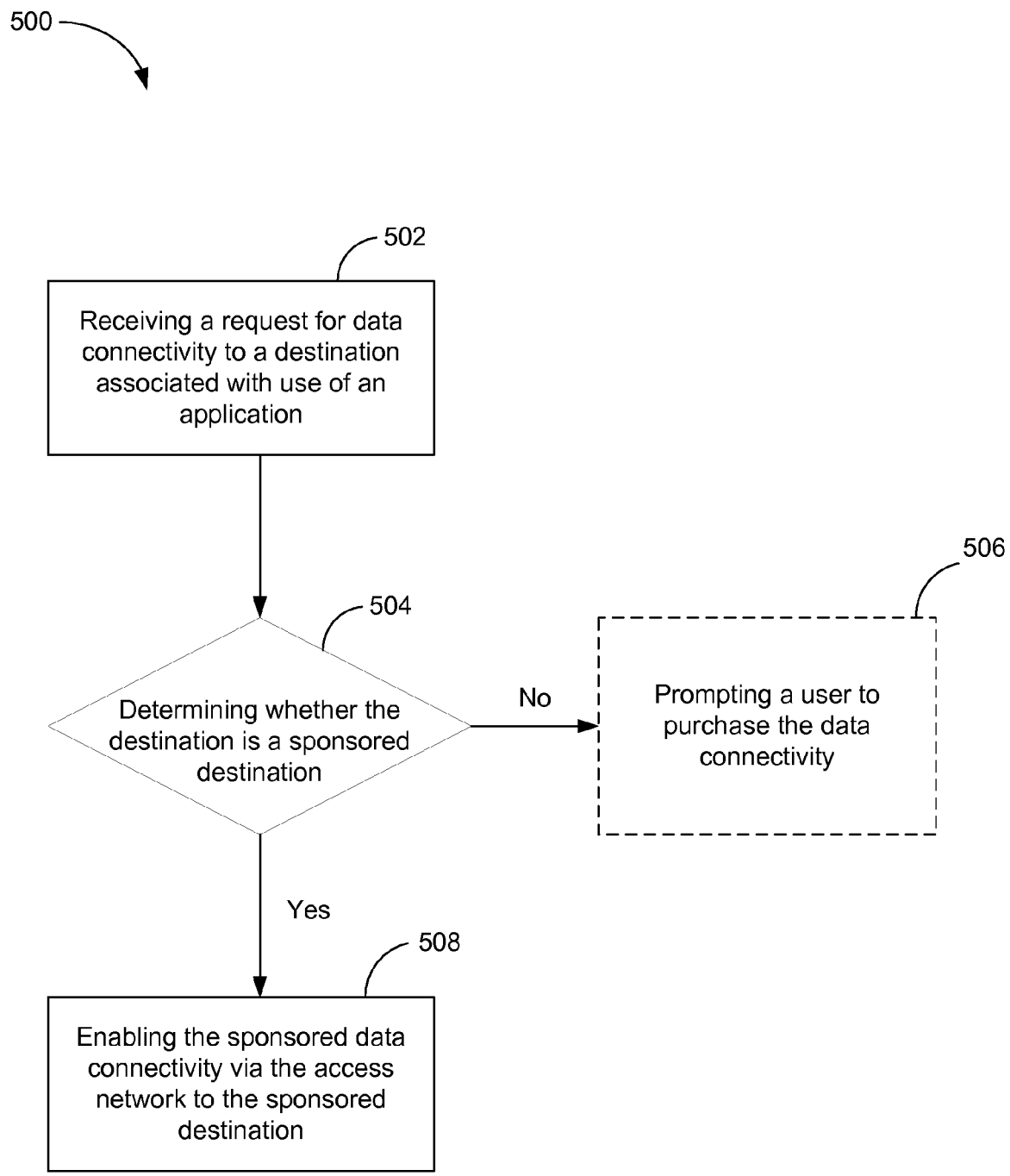
FIG. 5 is an example flow chart illustrating a method for providing data connectivity in accordance with an aspect.

Referring now to FIG. 5, a method 500 for providing data connectivity in accordance with an aspect may include, at 502, receiving a request for data connectivity to a destination associated with use of an application. The destination may be associated with a server and/or service provider that provides services and/or data connectivity for the application requested.

Next, at 504, the method may include determining whether the destination is a sponsored destination. The sponsored destination may be associated with one or more applications. Sponsored destinations may provide sponsored data connectivity, such as data connectivity services that are paid for, or partially paid for, by the destination (e.g., a third party, such as an application service provider associated with the destination) for the sponsored applications. Sponsored applications may include, but are not limited to, any application that requires connectivity with an access network, such as an on-line access component. Examples of sponsored applications may include, but are not limited to, social networking applications, messaging applications, network browsing applications, communication applications, sports applications, entertainment applications, shopping applications, electronic book applications, news applications, music applications, game applications, and/or other sponsored applications.

In an aspect, the access network or a component thereof, such as a data connection managing component, may determine whether the destination is a sponsored destination. For example, applications may have an identifier associated with the application to identify that the application is a sponsored application. The identifier may be associated with a destination, e.g., a server for performing the data connectivity for use with the application. In another aspect, the access network may forward a request to separate entity (e.g. a remotely located data connection managing component and/or a server associated with the requested service) in communication with the access network requesting that the entity determine whether the destination is a sponsored destination. The access network may receive a response from the entity indicating whether the destination is a sponsored destination, and the access network (and/or data connection managing component) may thereby determine whether or not the destination is sponsored. For example, the identifier may be associated with a proxy server dedicated to a service provider, such as an application service provider for providing services and/or data connectivity for use with the application. The proxy server may receive the communications from the sponsored application associated with the service provider and provide access to the access network for the sponsored applications. Thus, the proxy server may determine whether the application is a sponsored application, and determine whether to provide the sponsored data connectivity to the access network for use with the sponsored application.

It should be appreciated that more than one application on the wireless device may be a sponsored application. Thus, the wireless device may have access to multiple applications that are sponsored by one or more third parties.

If the destination is not a sponsored destination, at 506, the method may optionally include prompting the user to purchase data connectivity for accessing the access network for the application. Alternatively, or in addition, the method may use other forms of data connectivity for use with the application, such as WiFi or the user's data connectivity plan, and/or other forms of data connectivity.

When the destination is a sponsored destination, at 508, the method may include enabling sponsored data connectivity from the destination with the access network for the application. In an aspect, the sponsored data connectivity may be provided by the access network. The sponsored data connectivity may be based upon a predetermined agreement between the access network and the destination sponsoring the data connectivity. Thus, when the sponsored application is downloaded onto the wireless device and launched by the wireless device, the sponsored data connectivity may already be established with between the access network and the destination. In another aspect, the sponsored data connectivity may be negotiated between the destination and the access network upon a request for data connectivity by the user. In another aspect, the sponsored data connectivity may be provided through a separate entity in communication with the access network.

The sponsored data connectivity may have connection parameters determining the amount of data connectivity available and/or the time period during which the connectivity is available. Connection parameters may include, but are not limited to, an amount of data (e.g., the number of bytes) capable of being exchanged using the sponsored connectivity, a number of users capable of using the sponsored data connectivity, an amount of data exchange per user (e.g., 10 megabytes per user), a number of times of using the sponsored data connectivity, a time period during which the sponsored data connectivity is available, and/or other connection parameters.

In addition, the access network and the destination, e.g., the third party sponsoring the data connectivity, may have a system in place for receiving and/or generating payments for the sponsored data connectivity. Thus, the third party, not the user, may provide the payment to the access network for the sponsored data connectivity. Payment between the third party and the access network may be based upon, but not limited to, a bulk rate arrangement, a charge per mega byte, or any other payment agreement between the third party and access network. It should be appreciated, however, that the user may pay for the portions of the data connectivity not sponsored by the third party and/or may pay for the data connectivity when the sponsored data connectivity expires and/or runs out.

Figure 6:
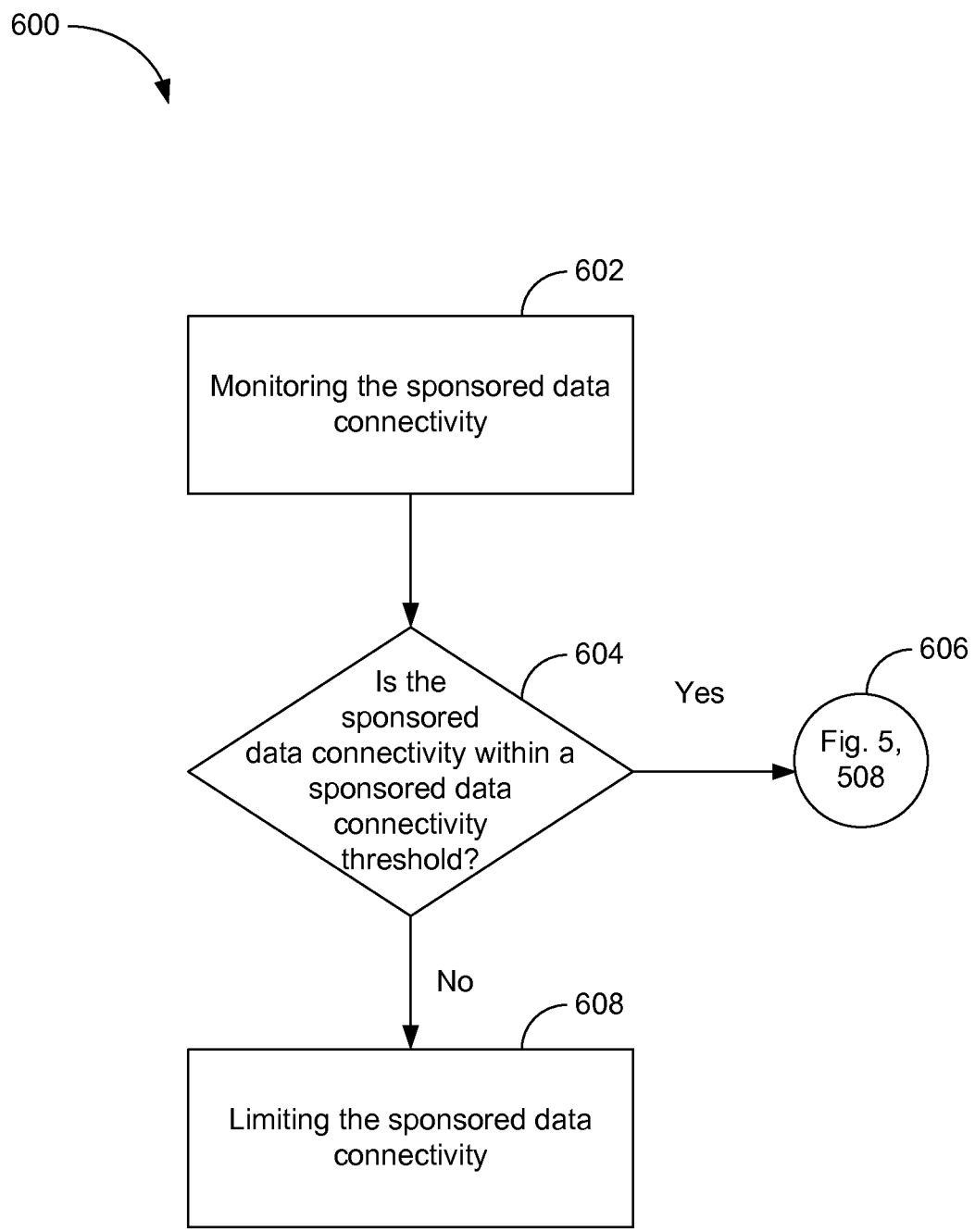
FIG. 6 is an example flow chart illustrating monitoring data connectivity in accordance with yet another aspect.

Referring now to FIG. 6, a method 600 in accordance with yet another aspect may include, at 602, monitoring the sponsored data connectivity. In one aspect, a data connection manager component may receive the data traffic associated with the sponsored application and monitor the amount of data traffic using the sponsored connectivity.

Next, at 604, the method may include determining whether the sponsored data connectivity is within a sponsored connectivity threshold. The sponsored connectivity threshold may be based upon an amount of data exchanged using the sponsored data connectivity, an amount of data exchange per user (e.g., 10 megabytes per day), a number of users capable of using the sponsored data connectivity, a number of times of using the sponsored data connectivity, a time period during which the sponsored data connectivity may be used (e.g., a 30 day trial period), and/or other sponsored connectivity thresholds.

In an aspect, the data connection manager component may monitor the data connectivity, as discussed in 602, and compare the monitored data connectivity with the sponsored connectivity threshold. The data connection manager component may determine whether the data connection is within the connectivity threshold. In an aspect, an icon, such as a gauge, may be displayed illustrating the sponsored connectivity threshold in relation to the monitored data connectivity. A user may be able to determine whether the monitored data is within the sponsored data connectivity by looking at the icon on the display.

When the sponsored data connectivity is within the sponsored data connectivity threshold, at 606, the method may proceed to 508 (FIG. 5) and provide the sponsored data connectivity with the access network for the sponsored application. For example, when the monitored data connectivity is within the amount of data exchange per user, e.g., 10 megabytes per day, then the data connection manager may determine that the sponsored data connectivity is within the sponsored data connectivity threshold.

However, when the sponsored data connectivity is not within the sponsored data connectivity threshold, e.g., the sponsored data connectivity exceeds the sponsored data connectivity threshold, the method, at 608, may include limiting the sponsored data connectivity. Limiting the sponsored data connectivity may include, but is not limited to, stopping the sponsored data connectivity, switching from the sponsored data connectivity to another form of data connectivity (e.g., internet connectivity paid for by the user or another third party, a WiFi connection, or an Ethernet connection), or prompting the third party to provide additional quota for the data connectivity, prompting the user to purchase data connectivity, and/or other forms of limiting the sponsored data connectivity. For example, a notification may be displayed notifying the user that the sponsored data connectivity has been limited.

Figure 7:
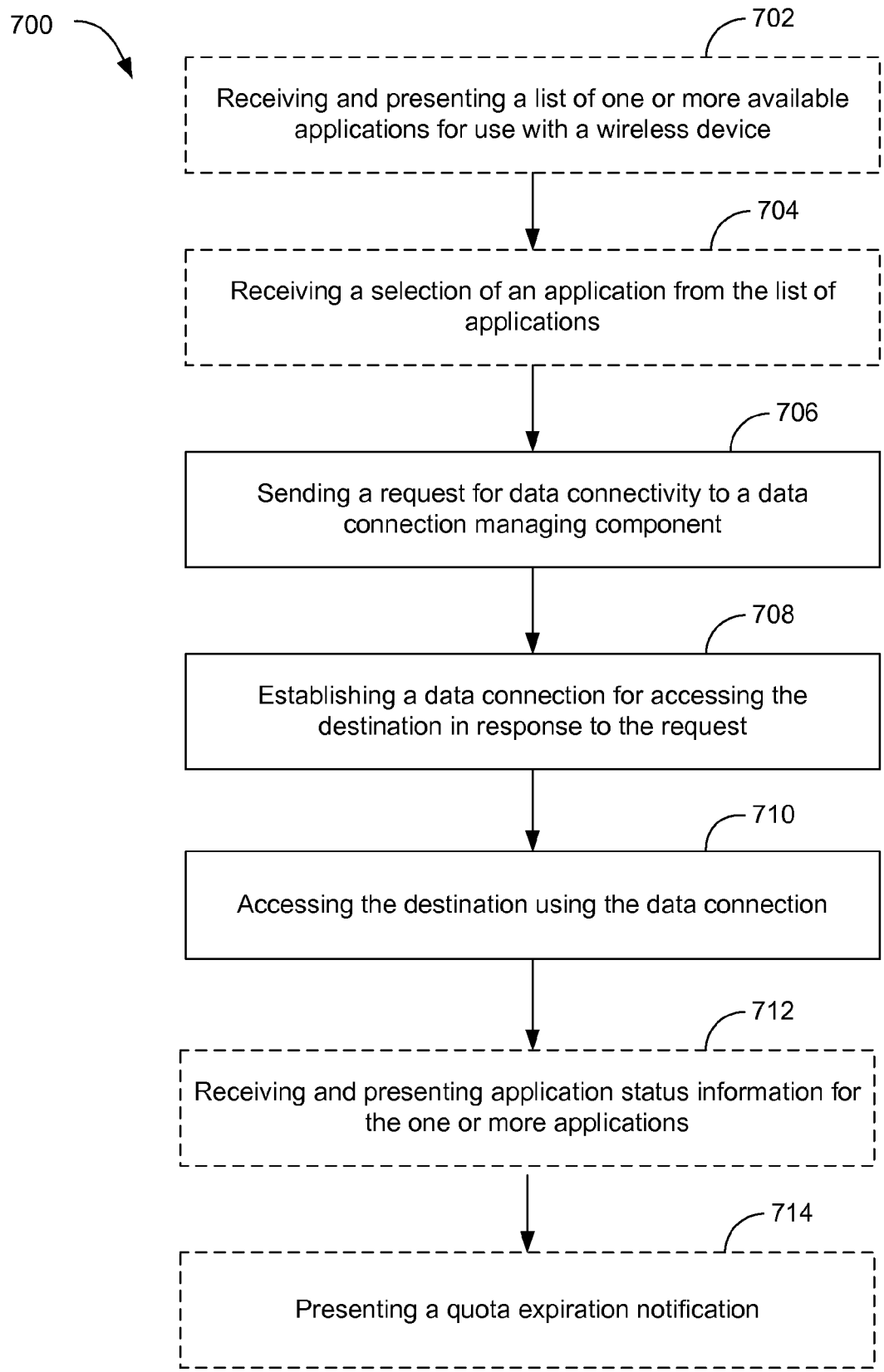
FIG. 7 is an example flow chart illustrating requesting data connectivity in accordance with another aspect.

Referring now to FIG. 7, a method 700 for requesting data connectivity in accordance with an aspect may optionally include, at 702, receiving and presenting a list of one or more available applications for use with a wireless device. The wireless device may receive a list of applications from a server that are available for use on the wireless device and a presenting component on the wireless device may display the list of available applications to a user of the wireless device. The one or more applications may be stored on the wireless device. In addition and/or alternatively, the one or more applications may not be stored on the wireless device but may be accessed at a destination. For example, the user of wireless device may input the destination for an application, such as, a website address for a shopping application, and receive access to the application at the entered destination.

In an aspect, one or more of the applications may include sponsored applications, e.g., applications that are paid for, or partially paid for by a third party. Sponsored applications may include, but are not limited to, any application that requires connectivity with an access network, such as an on-line access component. Examples of sponsored applications may include, but are not limited to, social networking applications, messaging applications, network browsing applications, communication applications, sports applications, entertainment applications, shopping applications, electronic book applications, news applications, music applications, game applications, and/or other sponsored applications.

The method, at 704, may also optionally include receiving a selection of an application from the list of applications. In an aspect, a user of a wireless device may select one or more applications to use on wireless device. For example, a user may select an application by double click, single click, right-click, etc., on any application and/or use touch screen capabilities by using various gestures, such as, for example, dragging and pinching the application.

At 706, the method may include sending a request for data connectivity to a data connection managing component. The request may identify a destination associated with use of an application. For example, a requestor component on the wireless device may send the request for data connectivity to a server associated with the destination. Data connectivity may include, but is not limited to, sponsored data connectivity to an access network for use with the application, the user's service provider plan for accessing the access network, a WiFi connection, or an Ethernet connection, an amount of data (e.g., the number of bytes) capable of being exchanged, a number of users capable of using the data connectivity, an amount of data exchange per user (e.g., 10 megabytes per user), a number of times of using the data connectivity, a time period during which the data connectivity is available (e.g., the time of day), and/or other forms of data connectivity.

At 708, the method may include establishing a data connection for accessing the destination in response to the request. For example, a destination access component on the wireless device may establish the data connection for accessing the requested destination. In an aspect, when the destination is determined to be a sponsored destination, the data connection may comprise a sponsored data connection to the destination for use with the application. Sponsored data connectivity may include, but is not limited to, data connectivity services that are paid for, or partially paid for, by the destination (e.g., a third party, such as an application service provider associated with the destination) or some other party (e.g., other than the device user) for the sponsored applications. For example, the sponsored data connection may include connection parameters associated with the sponsored data connectivity that may define the connection threshold for the sponsored data connectivity provided to the access network via the destination. For example, the connection threshold may include, but is not limited to, an amount of data (e.g., the number of bytes) capable of being exchanged using the sponsored data connectivity, a number of users capable of using the sponsored data connectivity, an amount of data exchange per user (e.g., 10 megabytes per user), a number of times of using the sponsored data connectivity, a time period during which the sponsored data connectivity is available (e.g., the time of day), and/or other connection parameters.

At 710, the method may include accessing the destination using the received data connectivity. For example, the destination access component on the wireless device may access the destination using a sponsored link.

The method may optionally include, at 712, receiving and presenting application status information for the one or more applications associated with the wireless device. Application status information may include, but is not limited to, whether sponsored data connectivity is available, the amount of data remaining for the sponsored data connectivity, the available quota for the sponsored data connectivity, and/or other application status information. For example, the wireless device may receive the application status information from a server and the presenting component may present the received application status information on an interface of the wireless device. It should be noted that action 712 may occur at any time in method 700.

Figure 10:
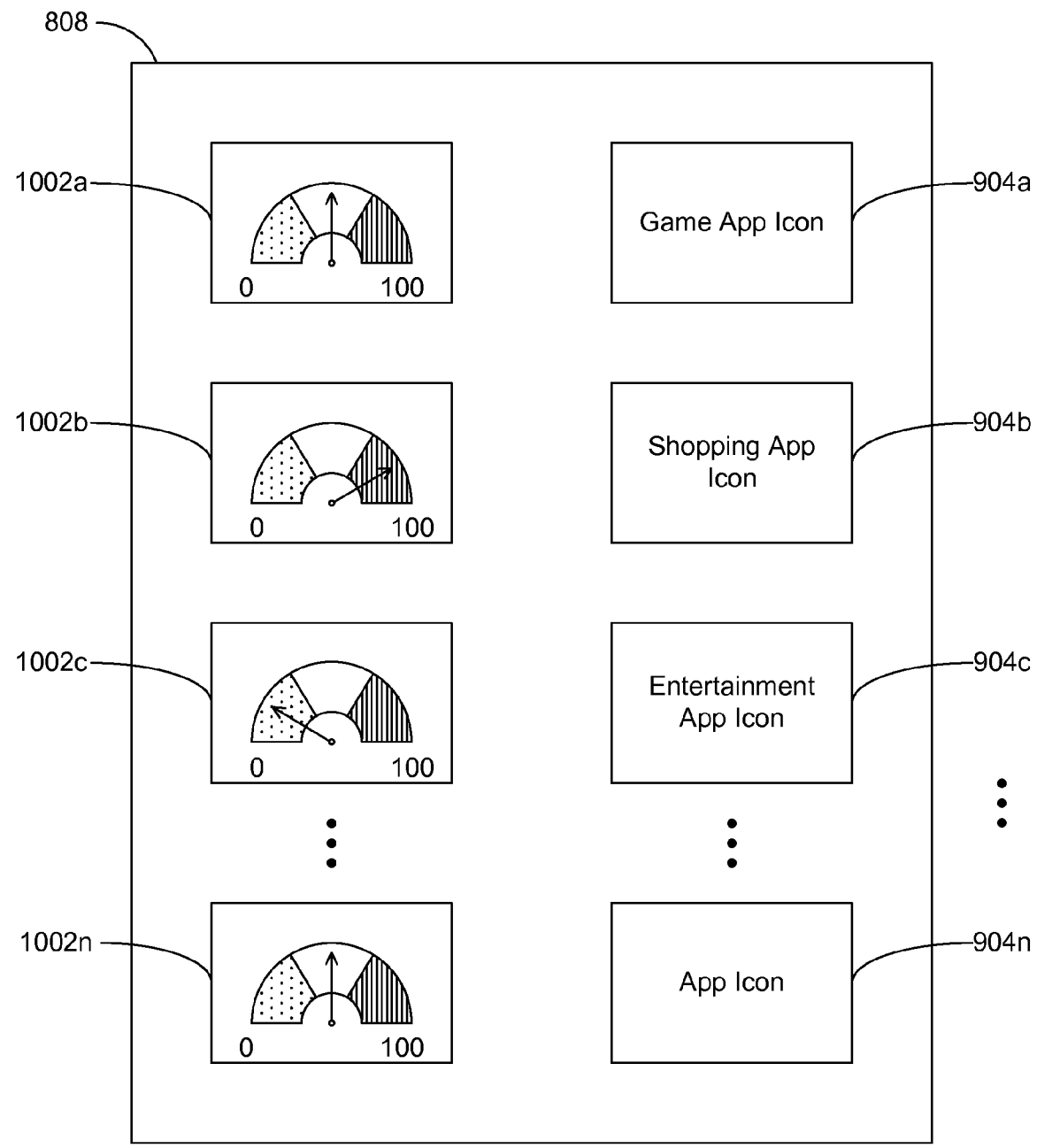
FIG. 10 illustrates an example screen shot with the status of the available sponsored applications in accordance with yet another aspect.

For example, the application status information may be presented on a display of the wireless device. For example, one possible format may include: '<Application Name>, <Sponsored>, <% of Quota Remaining>' (e.g., Shopping Application, Sponsored, 10% of Sponsored data remaining). Another example may include presenting the application status information using a gauge displayed on the wireless device, for example as illustrated in FIG. 10. In an aspect, the gauge may display the amount of connectivity remaining for the application. For example, when the application is a sponsored application, the gauge may display a percentage or unit value of remaining sponsored connectivity for the particular application. It should be appreciated that the application status information may be displayed in a variety of manners.

In addition, at 714, the method may optionally include presenting a quota expiration notification to a user that the data connectivity may be expiring and/or expired. For example, the wireless device may receive a quota notification from the server and the presenting component may present to a user the quota expiration notification when the user selects an application in which the quota has expired. In an aspect, for example, the quota notification may include, but is not limited to, a maximum number of users or data has been used. In one aspect, when the quota is expiring and/or has expired, the wireless device may present prompts to the user of the wireless device to purchase data connectivity for accessing the application, to select a different sponsored application to use, and/or the user may be prompted to use an alternative data connection, e.g., another 3G connection, WiFi, or Ethernet. It should be noted that action 714 may occur at any time in method 700.

Figure 8:
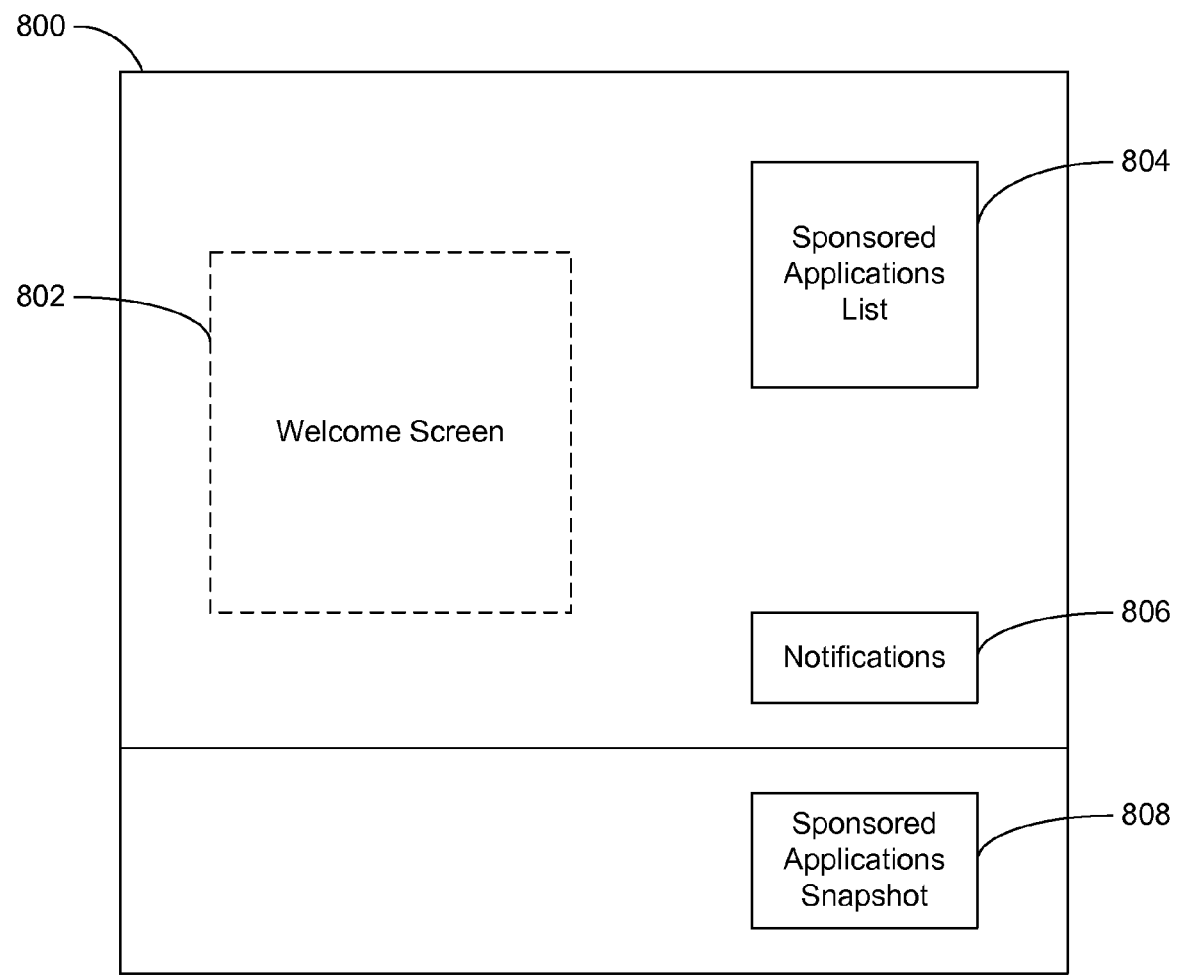
FIG. 8 illustrates an example screen shot in accordance with still another aspect.
Figure 9:
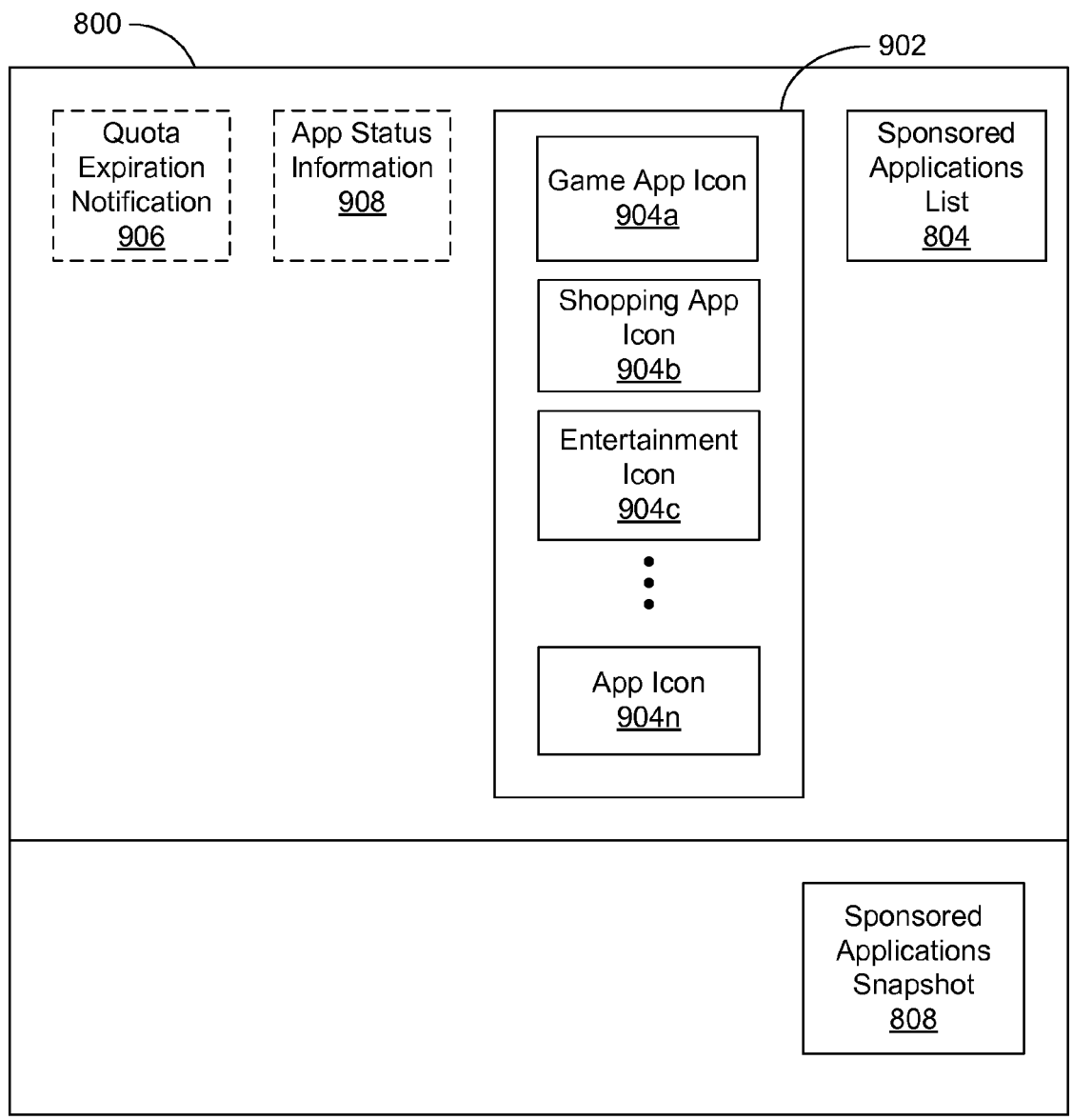
FIG. 9 illustrates an example screen shot with a list of available sponsored applications in accordance with another aspect.

Illustrative examples of screen shots executed by a wireless device in accordance with an aspect are illustrated in FIGS. 8-10. Referring now to FIG. 8, in an aspect, a main page 800 may be displayed to a user on the wireless device. Main page 800 may include a welcome screen 802 which provides a user with information about the sponsored connectivity services available on the wireless device. For example, welcome screen 802 may include the terms and conditions for using the sponsored connectivity services, the available sponsored applications, and/or a trial period during which the user may demo the connectivity services, among other information about the sponsored connectivity services available on the wireless device. It should be appreciated that welcome screen 802 may automatically display on the wireless device upon the initial power-up of the device. Upon subsequent power-ups, the welcome screen 802 may appear when the user requests the welcome screen 802.

Main page 800 may also include a sponsored application list icon 804. When the user selects the sponsored application list icon 804, a list of sponsored applications may appear adjacent to the sponsored application list icon 804, as illustrated in FIG. 9. The application sponsor list 902 may include one or more application icons, e.g., 904a-904n, for the available sponsored applications. In addition, the application sponsor list 902 may be scrollable allowing the user the capability to view all the available applications listed. The applications icon 904a-904n may be displayed in variety of manners. For example, the applications icons 904a-904n may be displayed in a list or a matrix form. In addition, the applications icons 904a-904n may be displayed in descending order based upon a ranking with the highest ranked application displayed first. The ranking may be based upon, for example, the availability of data connectivity for the application, the popularity of the application (e.g., the number of users viewing and/or using the application), or user rankings for the application, among other rankings.

When the user selects an application icon 904a, the respective application may launch and the user may have access to the access network for use with the application via the sponsored data connection. In an aspect, application status information 908 may be displayed next to the application icons 904a-904n so the user may determine whether sponsored connectivity is available for the respective application. The application status information 908 may include, but is not limited to, whether sponsored data connectivity is available, the amount of data remaining for the sponsored data connectivity, the available quota for the sponsored data connectivity, and/or other application status information. The application status information 908 may be displayed, for example, using an icon where the color changes based upon the changes in the application status. For example, the icon may be green when the application is capable of sponsored connectivity, e.g., the application has quota remaining and the trial period has not expired. Alternatively, the icon may turn grey when the application is no longer capable of sponsored connectivity. The application may no longer be capable of sponsored connectivity, for example, when the application has used up the available quota, or when the trial period has expired. It should be appreciated that the application status information 908 may be affected by the available quota and the trail period, and may not be based upon the connection type, e.g., the 3G sponsored connection, another 3G connection, WiFi, Ethernet, and/or other connection types.

In an aspect, a quota expiration notification 906 may be displayed indicating that the selected application's available quota is no longer available. For example, when the user selects an application in which the quota has expired, e.g., the maximum number of users or data has been used, the quota expiration notification 906 may be displayed to the user notifying the user that the application is no longer available as a sponsored application. If, however, the application's quota expires, e.g., the trial period expires, when the user is using the application, the quota expiration notification 906 may be displayed to the user notifying the user that the quota has expired. Upon receiving the quota expiration notification 906, the user may select a different sponsored application to use, the user may be prompted to purchase data connectivity for accessing the application, and/or the user may be prompted to use an alternative data connection, e.g., another 3G connection, WiFi, or Ethernet.

Referring back to FIG. 8, the sponsored application list icon 804 may be, but is not limited to, a widget and/or an icon on the desktop. The user may move the sponsored application list icon 804 anywhere on the main page 800. In addition, the user may resize and/or change the image of sponsored application list icon 804. When the user right clicks on the sponsored application list icon 804, a menu may appear with information about the services provided. It should be appreciated, however, that the user may not be able to delete the sponsored application list icon 804 from the main screen 800 until the trail period for using the sponsored connectivity services provided on the wireless device expire and/or the user uninstalls the sponsored connectivity services application from the wireless device.

Main page 800 may additionally include a sponsored application snapshot icon 808 which may display a snapshot of the current status 1002a-1002n of all the sponsored applications 604a-604n, as illustrated in FIG. 10, when the user selects the snapshot icon 808. In an aspect, the current status 1002a-1002n of the sponsored applications 604a-604n may be display using, for example, a gauge display showing the amount of connectivity left for the sponsored application. When the gauge, e.g., the arrow, gets to a zero value, the sponsored connectivity may no longer be available and the user may need to access the application using an alternative connection, e.g., internet connectivity paid for by the user. The current status of the sponsored applications may also include, but is not limited to, the application name, the sponsor for the application, and the quota remaining, such as the percentage of data remaining or number of users who can still access the application. Thus, the sponsored application snapshot icon 808, may provide a user with a quick view of the sponsored applications available, along with the remaining quota for the application.

Referring back to FIG. 8, main page 800 may further include a notification area 806. The notification area 806 may display a variety of information based upon the user's actions. In one aspect, when the user selects a sponsored application, then the notification area 806 may display information about the service provider sponsoring the data connectivity. As the user switches from one application to another application, the notification area 806 may display information based upon the changes.

Figure 11:
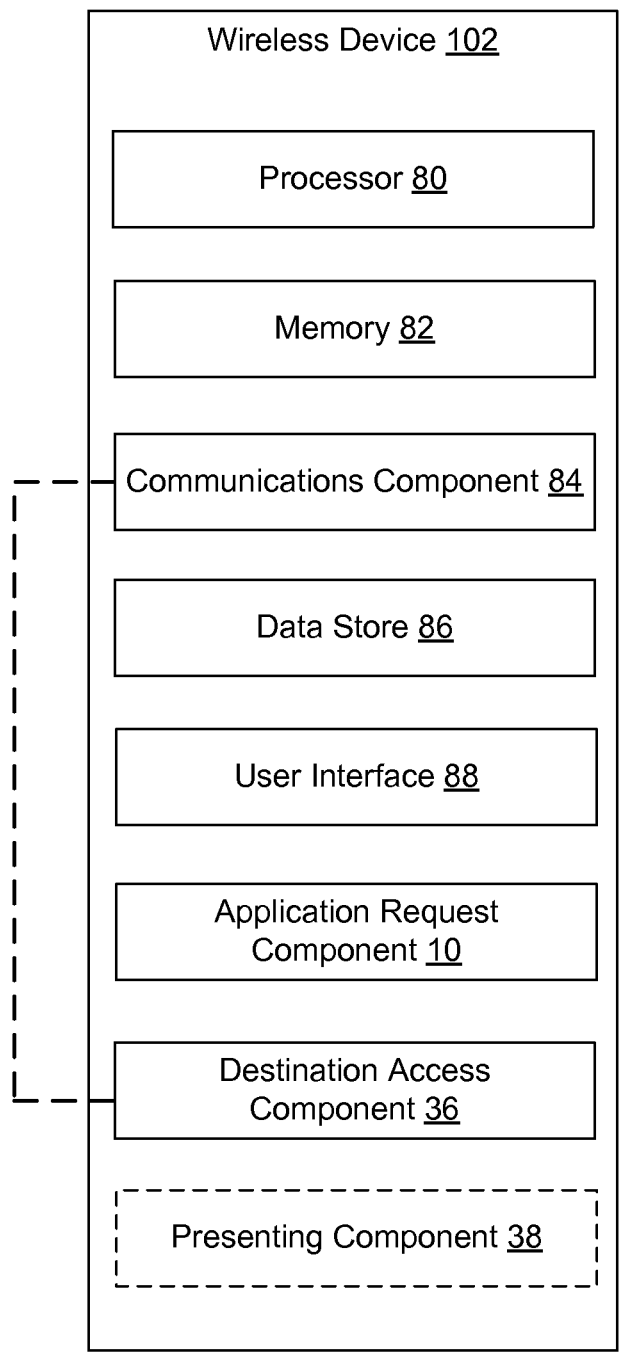
FIG. 11 is a an example wireless device operable within the connectivity system in accordance with an aspect.
Figure 12:
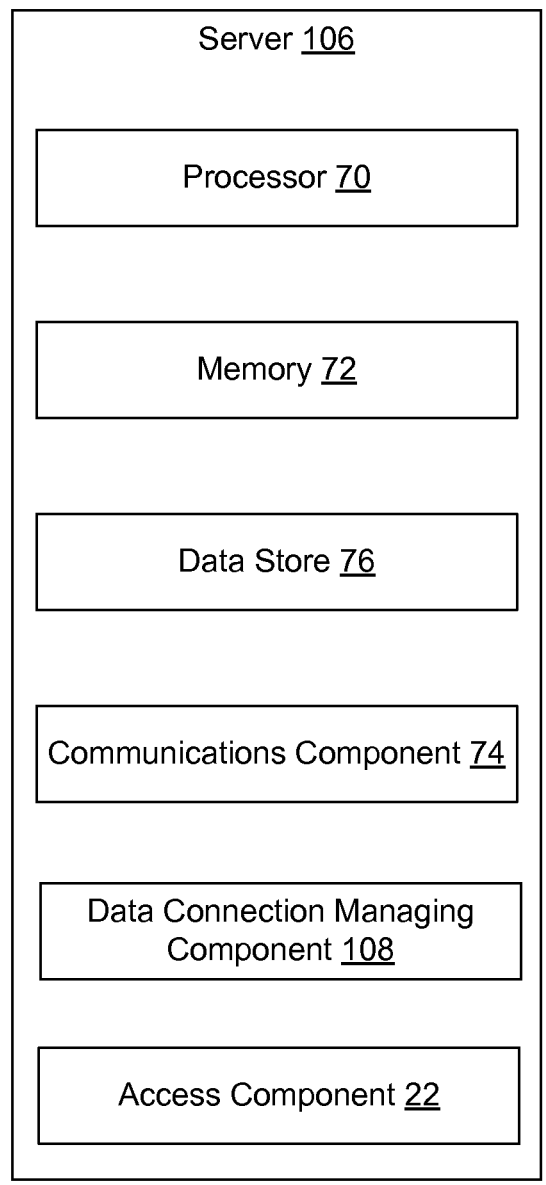
FIG. 12 is an example sever device operable within the connectivity system in accordance with yet another aspect.

Referring now to FIG. 11, illustrated is an example wireless device 102 operable within the connectivity system in accordance with an aspect. In one aspect, wireless device 102 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Wireless device 102 may further include a memory 82, such as for storing local versions of applications being executed by processor 80. Memory 82 can include a type of memory usable by a computer, such as random access memory (RAM), read only memory (ROM), tapes, magnetic discs, optical discs, volatile memory, non-volatile memory, and any combination thereof.

Further, wireless device 102 may include a communications component 84 that provides for establishing and maintaining communications with one or more parties utilizing hardware, software, and services as described herein. Communications component 84 may carry communications between components on wireless device 102, as well as between wireless device 102 and external devices, such as devices located across a communications network and/or devices serially or locally connected to wireless device 102. For example, communications component 84 may include one or more buses, and may further include transmit chain components and receive chain components associated with a transmitter and receiver, respectively, operable for interfacing with external devices.

Additionally, wireless device 102 may further include a data store 86, which can be any suitable combination of hardware and/or software, that provides for mass storage of information, databases, and programs employed in connection with aspects described herein. For example, data store 86 may be a data repository for applications not currently being executed by processor 80.

Wireless device 102 may additionally include a user interface component 88 operable to receive inputs from a user of wireless device 102 and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Wireless device 102 may also include an application request component 10 (FIG. 1) operable for requesting data connectivity associated with use of an application. In addition, wireless device 102 may include a destination access component 36 operable to access one or more destinations using the received data connectivity associated with one or more applications 12. Wireless device 102 may also include a presenting component 38 operable to receive and present application status information 39. In an aspect, user interface component 88 may transmit and/or receive messages corresponding to the operation of application request component 10, destination access component 36, and/or presenting component 38. In addition, processor 80 executes application request component 10, destination access component 36, and presenting component 38, and memory 82 or data store 86 may store them.

Referring now to FIG. 10, illustrated is an example sever device 106 operable within the connectivity system in accordance with yet another aspect. Server 106 manages network connectivity matters for access network 104. Server 106 may include processor component 70 for carrying out processing functions associated with one or more of components and functions described herein. Processor component 70 can include a single or multiple set of processors or multi-core processors. Moreover, processing component 70 can be implemented as an integrated processing system and/or a distributed processing system.

Server 106 may further include a memory 72, such as for storing local versions of applications being executed by processor component 70. Memory 72 can include random access memory (RAM), read only memory (ROM), and a combination thereof.

Further, server 106 may include a communications component 74 that provides for establishing and maintaining communications with one or more parties utilizing hardware, software, and services as described herein. Communications component 74 may carry communications between components on server 106, as well as between server 106 and external devices, such as devices located across a communications network and/or devices serially or locally connected to server 106.

Additionally, server 106 may further include a data store 76, which can be any suitable combination of hardware and/ or software, that provides for mass storage of information, databases, and programs employed in connection with aspects described herein. For example, data store 76 may be a data repository for applications not currently executing.

Server 106 may also include a data connection managing component 108 (FIG. 1) operable for receiving a request for data connectivity from a destination and determining whether the destination is a sponsored destination which provides sponsored data connectivity to access network. Server 106 may also include an access component 22 operable to provide data connectivity to a wireless device via an access network for use with an application. In an aspect, communications component 74 may transmit and/or receive messages corresponding to the operation of data connection managing component 108 and/or access component 22. In addition, processor 70 may execute data connection managing component 108 and access component 22, and memory 72 may store them.

One variation of the aspects disclosed may include enabling sponsored data connectivity based upon a user's data connection plan for the wireless device. For example, when the user has a plan for an unlimited amount of data connection, the third party service provider may decline to provide the sponsored data connectivity since the user may already have access to the access network without an additional charge to the user. However, when the user has a limited amount of data connectivity to the access network, the third party service provider may provide the sponsored data connectivity and/or prorate the sponsored data connectivity based upon the user's connection plan.

Figure 13:
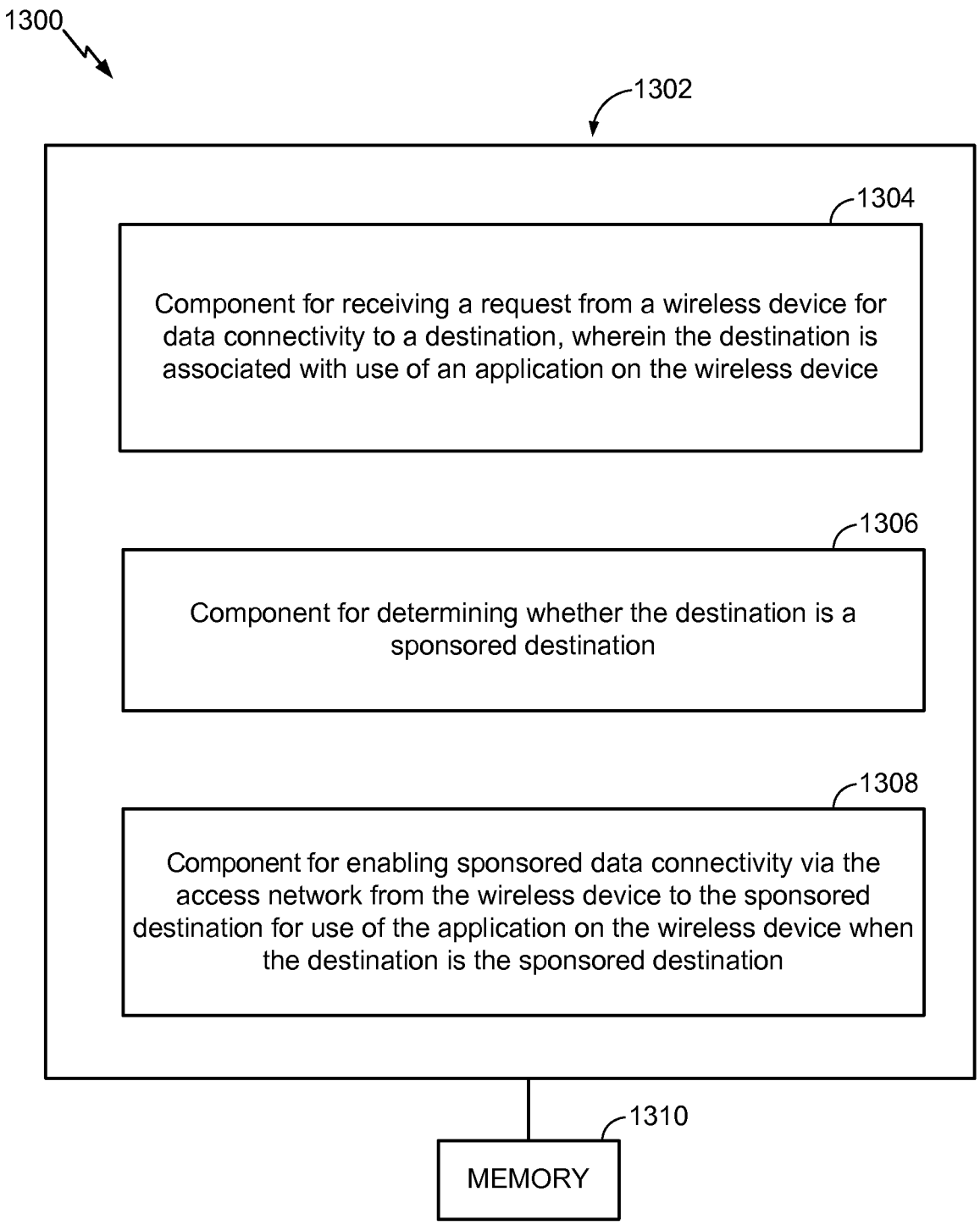
FIG. 13 is an illustration of an example system that facilitates providing data connectivity in accordance with another aspect.

Referring now to FIG. 13, illustrated is a system 1300 configured to provide data connectivity. For example, system 1300 can reside at least partially within a transmitter, mobile device, etc. It is to be appreciated that system 1300 is represented as including functional blocks, which can be functional blocks that represent functions implemented by a processor, software, or combination thereof (e.g., firmware). System 1300 may include a logical grouping 1302 of electrical components that facilitate providing data connectivity. For instance, logical grouping 1302 may include component 1304 for receiving a request from a wireless device for data connectivity to a destination, wherein the destination is associated with use of an application on the wireless device. Further, logical grouping 1302 may comprise component 1306 for determining whether the destination is a sponsored destination. In addition, logical grouping 1302 may include component 1308 for enabling sponsored data connectivity via the access network from the wireless device to the sponsored destination for use of the application on the wireless device when the destination is the sponsored destination. Additionally, system 1300 can include a memory 1310 that retains instructions for executing functions associated with electrical components 1304, 1306, and 1308. While shown as being external to memory 1310, it is to be understood that one or more of electrical components 1304, 1306, and 1308 can exist within memory 1310.

Figure 14:
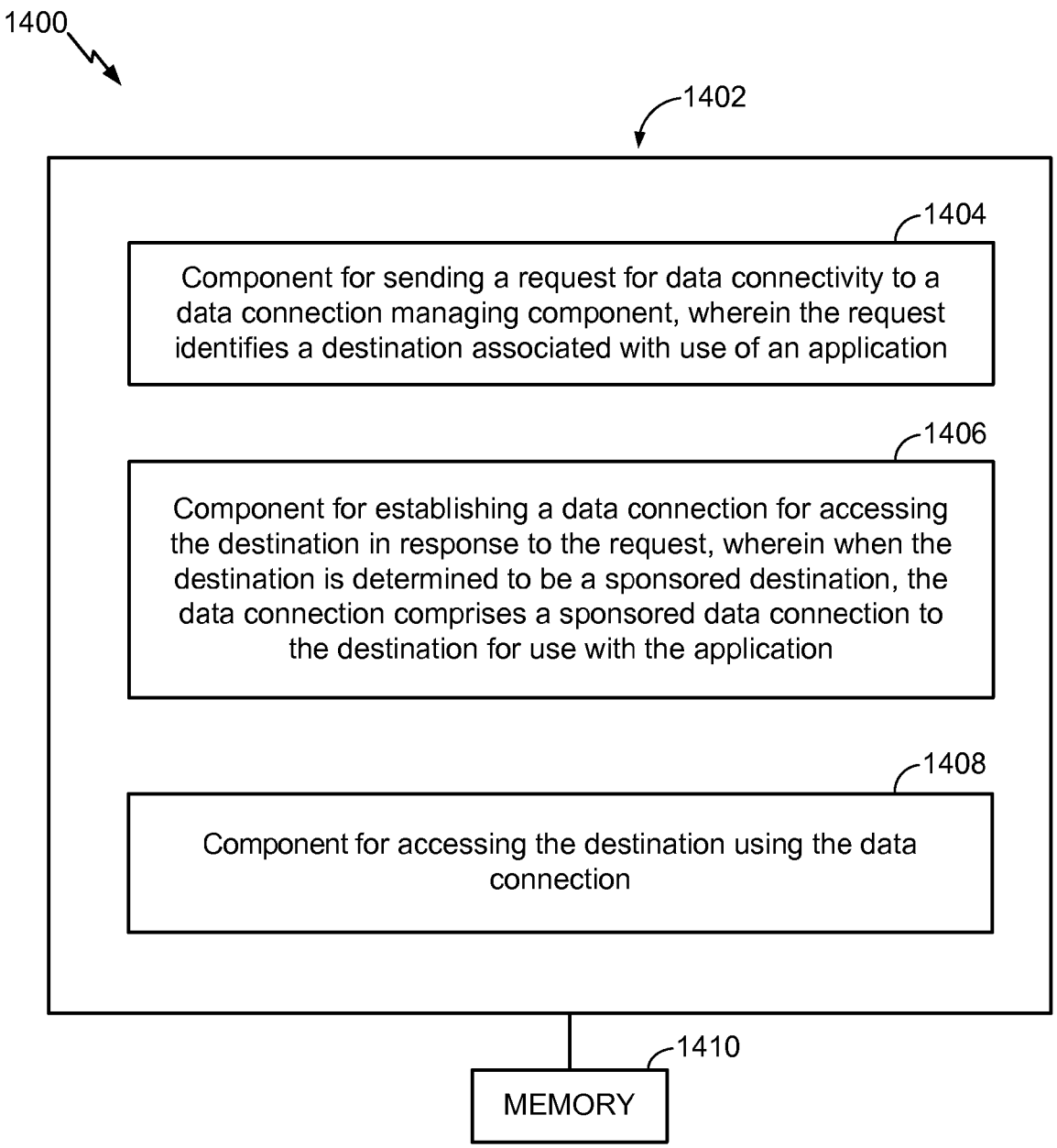
FIG. 14 is an illustration of an example system that facilitates requesting data connectivity in accordance with another aspect.

Referring now to FIG. 14, illustrated is a system 1400 configured to requesting data connectivity. For example, system 1400 can reside at least partially within a transmitter, mobile device, etc. It is to be appreciated that system 1400 is represented as including functional blocks, which can be functional blocks that represent functions implemented by a processor, software, or combination thereof (e.g., firmware). System 1400 may include a logical grouping 1402 of electrical components that facilitate requesting data connectivity. For instance, logical grouping 1402 may include component 1404 for sending a request for data connectivity to a data connection managing component, wherein the request identifies a destination associated with use of an application. Further, logical grouping 1402 may comprise component 1406 for establishing a data connection for accessing the destination in response to the request, wherein when the destination is determined to be a sponsored destination, the data connection may comprise a sponsored data connection to the destination for use with the application. In addition, logical grouping 1402 may include component 1408 for accessing the destination using the data connection. Additionally, system 1400 can include a memory 1410 that retains instructions for executing functions associated with electrical components 1404, 1406, and 1408. While shown as being external to memory 1410, it is to be understood that one or more of electrical components 1404, 1406, and 1408 can exist within memory 1410.

Another variation of the aspects disclosed may include providing a user rewards for using the applications associated with the sponsored data connectivity. For example, when a user frequently uses the sponsored applications, then the user may receive additional sponsored data connectivity to encourage the user to continuing using the sponsored application. Moreover, when the user uses the sponsored application to make purchase, then the user may receive other rewards, such as discounts and/or incentives to continue making purchases using the sponsored application.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for providing data connectivity with an access network, the method comprising:
 receiving a request from a wireless device for data connectivity to a destination, wherein the destination is associated with use of a sponsored application on the wireless device, the sponsored application is associated with an identifier, and the request comprises a first identifier of the destination and a second identifier of the wireless device;

determining whether the destination is a sponsored destination for providing a sponsored data connectivity to the sponsored application, comprising forwarding the request to a network entity that is associated with the identifier of the sponsored application, and receiving a response from the network entity for indicating, based on the first identifier, whether the destination is the sponsored destination;

determining, based on the second identifier, whether the wireless device is allowed to receive the sponsored data connectivity; and enabling the sponsored data connectivity via the access network from the wireless device to the sponsored destination for use of the sponsored application on the wireless device upon detecting that the destination is the sponsored destination and the wireless device is allowed to receive the sponsored data connectivity.

2. The method of claim 1, wherein the sponsored data connectivity is at least partially paid for by a data connectivity sponsor.

3. The method of claim 2, wherein the data connectivity sponsor is one of an application provider or a third party entity.

4. The method of claim 1, wherein the sponsored data connectivity comprises one of free data connection or a reduced data connection charge.

5. The method of claim 1, further comprising limiting the sponsored data connectivity according to a sponsored data connectivity threshold.

6. The method of claim 1, wherein the determining whether the destination is a sponsored destination is further determined by at least one of a data connectivity sponsor and the access network prior to the request for data connectivity by the wireless device.

7. The method of claim 1, wherein the determining whether the destination is a sponsored destination is negotiated between at least one of a data connectivity sponsor and the access network in response to the request for data.

8. The method of claim 5, wherein the sponsored data connectivity threshold comprises one of an amount of data exchanged, a number of users capable of using the sponsored data connectivity, a number of times of using the sponsored data connectivity, a time period, or any combination thereof.

9. The method of claim 5, wherein the sponsored data connectivity threshold is determined by at least one of an application provider and the access network prior to the request for data connectivity by the wireless device.

10. The method of claim 5, wherein the sponsored data connectivity threshold is negotiated in response to the request for data connectivity.

11. The method of claim 1, wherein the receiving of the request and the determining are performed by an intermediary component.

12. The method of claim 11, wherein the intermediary component comprises one of an application intermediary component, an access network intermediary component, an application provider intermediary component, a data connectivity sponsor component or a wireless device intermediary component.

13. The method of claim 11, further comprising:
receiving, at the intermediary component, the request for the data connectivity to the sponsored destination associated with the sponsored application on the wireless device;

determining, via the intermediary component, whether the first and second identifiers correspond to the sponsored application; and providing the sponsored data connectivity when the first and second identifiers correspond to the sponsored application.

14. The method of claim 13, further comprising:
monitoring, via the intermediary component, the sponsored data connectivity to ensure the sponsored data connectivity is within a sponsored data connectivity threshold; and limiting the sponsored data connectivity if the sponsored data connectivity exceeds the sponsored data connectivity threshold.

15. The method of claim 13, wherein the sponsored data connectivity threshold comprises one of an amount of data exchanged, a number of users capable of using the sponsored data connectivity, a number of times of using the sponsored data connectivity, a time period, or any combination thereof.

16. The method of claim 1, further comprising:
receiving payment from the data connectivity sponsor for the sponsored data connectivity.

17. The method of claim 1, wherein the wireless device does not have a data connectivity plan with the access network and uses the sponsored data connectivity for accessing the access network.

18. The method of claim 1, further comprising:
generating a prompt for presentation to a user to purchase a data plan for connectivity to the access network when the destination is not the sponsored destination.

19. The method of claim 1, wherein the access network provides the sponsored data connectivity.

20. The method of claim 1, wherein a separate entity in communication with the access network provides the sponsored data connectivity.

21. An apparatus to provide data connectivity with an access network, comprising at least one processor configured to:

receive a request from a wireless device for data connectivity to a destination, wherein the destination is associated with use of a sponsored application on the wireless device, the sponsored application is associated with an identifier, and the request comprises a first identifier of the destination and a second identifier of the wireless device;

determine whether the destination is a sponsored destination for providing a sponsored data connectivity to the sponsored application, comprising forwarding the request to a network entity that is associated with the identifier of the sponsored application, and receiving a response from the network entity for indicating, based on the first identifier, whether the destination is the sponsored destination;

determine, based on the second identifier, whether the wireless device is allowed to receive the sponsored data connectivity; and enable the sponsored data connectivity via the access network from the wireless device to the sponsored destination for use of the application on the wireless device upon detecting that the destination is the sponsored destination and the wireless device is allowed to receive the sponsored data connectivity.

22. A non-transitory computer-readable medium, comprising:
at least one instruction for causing a computer to receive a request from a wireless device for data connectivity to a destination, wherein the destination is associated with use of a sponsored application on the wireless device, the sponsored application is associated with an identifier, and the request comprises a first identifier of the destination and a second identifier of the wireless device;

at least one instruction for causing the computer to determine whether the destination is a sponsored destination for providing a sponsored data connectivity to the sponsored application, comprising forwarding the request to a network entity that is associated with the identifier of the sponsored application, and receiving a response from the network entity for indicating, based on the first identifier, whether the destination is the sponsored destination;

at least one instruction for causing the computer to determine, based on the second identifier, whether the wireless device is allowed to receive the sponsored data connectivity; and at least one instruction for causing the computer to enable the sponsored data connectivity via the access network from the wireless device to the sponsored destination for use of the application on the wireless device upon detecting that the destination is the sponsored destination and the wireless device is allowed to receive the sponsored data connectivity.

23. An apparatus, comprising:

means for receiving a request from a wireless device for data connectivity to a destination, wherein the destination is associated with use of a sponsored application on the wireless device, the sponsored application is associated with an identifier, and the request comprises a first identifier of the destination and a second identifier of the wireless device;

means for determining whether the destination is a sponsored destination for providing a sponsored data connectivity to the sponsored application, comprising means for forwarding the request to a network entity that is associated with the identifier of the sponsored application, and means for receiving a response from the network entity for indicating, based on the first identifier, whether the destination is the sponsored destination;

means for determining, based on the second identifier, whether the wireless device is allowed to receive the sponsored data connectivity; and means for enabling the sponsored data connectivity via the access network from the wireless device to the sponsored destination for use of the application on the wireless device upon detecting that the destination is the sponsored destination and the wireless device is allowed to receive the sponsored data connectivity.

24. An apparatus for providing data connectivity with an access network, comprising:

a data connection component configured to receive a request from a wireless device for data connectivity to a destination, wherein the destination is associated with use of a sponsored application on the wireless device, the sponsored application is associated with an identifier, and the request comprises a first identifier of the destination and a second identifier of the wireless device; and an access component configured to:

determine whether the destination is a sponsored destination for providing a sponsored data connectivity to the sponsored application, wherein a detecting component is configured to determine, based on the second identifier, whether the wireless device is allowed to receive the sponsored data connectivity, comprising forwarding the request to a network entity that is associated with the identifier of the sponsored application, and receiving a response from the network entity for indicating, based on the first identifier, whether the destination is the sponsored destination; and enable the sponsored data connectivity via the access network from the wireless device to the sponsored destination for use of the application on the wireless device upon detecting that the destination is the sponsored destination and the wireless device is allowed to receive the sponsored data connectivity.

25. The apparatus of claim 24, wherein the sponsored data connectivity is at least partially paid for by a data connectivity sponsor.

26. The apparatus of claim 25, wherein the data connectivity sponsor is one of an application provider or a third party entity.

27. The apparatus of claim 24, wherein the sponsored data connectivity comprises one of free data connection or a reduced data connection charge.

28. The apparatus of claim 24, further comprising a filtering component configured to limit the sponsored data connectivity according to a sponsored data connectivity threshold.

29. The apparatus of claim 28, wherein the sponsored data connectivity threshold comprises one of an amount of data exchanged, a number of users capable of using the sponsored data connectivity, a number of times of using the sponsored data connectivity, a time period, or any combination thereof.

30. The apparatus of claim 28, wherein the sponsored data connectivity threshold is determined by at least one of an application provider and the access network prior to the request for data connectivity by the wireless device.

31. The apparatus of claim 28, wherein the sponsored data connectivity threshold is negotiated in response to the request for data connectivity.

32. The apparatus of claim 24, wherein the detecting component is further configured to determine whether the destination is a sponsored destination prior to the request for data connectivity by the wireless device.

33. The apparatus of claim 24, wherein the detecting component is further configured to determine whether the destination is a sponsored destination by negotiating between at least one of a data connectivity sponsor and the access network in response to the request for data.

34. The apparatus of claim 24, further comprising an intermediary component configured to receive the request and determine whether the destination is the sponsored destination.

35. The apparatus of claim 34, wherein the intermediary component comprises one of an application intermediary component, an access network intermediary component, an application provider intermediary component, a data connectivity sponsor component or a wireless device intermediary component.

36. The apparatus of claim 34, wherein the intermediary component is further configured to receive the request, determine whether the first and second identifiers correspond to the sponsored application, and provide the sponsored data connectivity if the first and second identifiers correspond to the sponsored application.

37. The apparatus of claim 36, wherein the intermediary component is further configured to monitor the sponsored data connectivity to ensure the sponsored data connectivity is within a sponsored data connectivity threshold, and limit the sponsored data connectivity if the sponsored data connectivity exceeds the sponsored data connectivity threshold.

38. The apparatus of claim 36, wherein the sponsored data connectivity threshold comprises one of an amount of data exchanged, a number of users capable of using the sponsored data connectivity, a number of times of using the sponsored data connectivity, a time period, or any combination thereof.

39. The apparatus of claim 24, further comprising a payment component configured to receive payment from the data connectivity sponsor for the sponsored data connectivity.

40. The apparatus of claim 24, wherein the wireless device does not have a data connectivity plan with the access network and uses the sponsored data connectivity for accessing the access network.

41. The apparatus of claim 24, further comprising a notification component configured to generate a prompt for presentation to a user to purchase a data plan for connectivity to the access network, if the destination is not the sponsored destination.

42. The apparatus of claim 24, wherein the access network provides the sponsored data connectivity.

43. The apparatus of claim 24, wherein a separate entity in communication with the access network provides the sponsored data connectivity.

44. A method for requesting data connectivity, comprising:
sending a request for data connectivity to a data connection managing component, wherein the request identifies a destination associated with use of a sponsored application, the sponsored application is associated with an identifier, and the request comprises a first identifier of the destination and a second identifier of a wireless device, wherein the data connect managing component is configured to forward the request to a network entity that is associated with the identifier of the sponsored application to determine whether the destination is a sponsored destination for providing a sponsored data connectivity to the sponsored application;
establishing a data connection for accessing the destination in response to the request upon detecting that a response received from the network entity indicating that the destination is determined, based on the first identifier, to be the sponsored destination, and that the wireless device is determined, based on the second identifier, to be allowed to receive the sponsored data connectivity, wherein the data connection comprises a sponsored data connection to the sponsored destination for use with the sponsored application; and
accessing, via the sponsored application, the sponsored destination using the sponsored data connection.

45. The method of claim 44, wherein the sponsored data connection comprises at least one of a third party paid for data connection, a free data connection, or a reduced charge data connection.

46. The method of claim 44, further comprising presenting application status information for the sponsored application corresponding to the sponsored data connection.

47. The method of claim 46, wherein the application status information comprises one of available sponsored data connection, an amount of data usage remaining for the sponsored data connection, or an available quota for the sponsored data connection.

48. The method of claim 44, further comprising:
receiving a list of one or more available applications;
presenting the list of the one or more available applications;
receiving a selection of the sponsored application from the list of one or more available applications to forward with the request; and
forwarding an identification of the selected application with the request.

49. The method of claim 48, wherein the one more available applications comprise sponsored applications.

50. The method of claim 44, further comprising receiving and presenting a quota expiration notification for the sponsored application, wherein the quota expiration notification is received when the maximum number of users or data has been used.

51. The method of claim 44, wherein the data connection is established upon detecting that the second identifier of the wireless devices corresponds to an approved wireless device identification.

52. An apparatus to request data connectivity, comprising at least one processor configured to:
send a request for data connectivity to a data connection managing component, wherein the request identifies a destination associated with use of a sponsored application, the sponsored application is associated with an identifier, and the request comprises a first identifier of the destination and a second identifier of a wireless device, wherein the data connect managing component is configured to forward the request to a network entity that is associated with the identifier of the sponsored application to determine whether the destination is a sponsored destination for providing a sponsored data connectivity to the sponsored application;
establish a data connection for accessing the destination in response to the request upon detecting that a response received from the network entity indicating that the destination is determined, based on the first identifier, to be the sponsored destination, and that the wireless device is determined, based on the second identifier, to be allowed to receive the sponsored data connectivity, wherein the data connection comprises a sponsored data connection to the sponsored destination for use with the sponsored application; and
enable the sponsored application to access the sponsored destination using the sponsored data connection.

53. A non-transitory computer-readable medium, comprising:
at least one instruction for causing a computer to send a request for data connectivity to a data connection managing component, wherein the request identifies a destination associated with use of a sponsored application, the sponsored application is associated with an identifier, and the request comprises a first identifier of the destination and a second identifier of a wireless device, wherein the data connect managing component is configured to forward the request to a network entity that is associated with the identifier of the sponsored application to determine whether the destination is a sponsored destination for providing a sponsored data connectivity to the sponsored application;
at least one instruction for causing the computer to establish a data connection for accessing the destination in response to the request upon detecting that a response received from the network entity indicating that the destination is determined, based on the first identifier, to be the sponsored destination, and that the wireless device is determined, based on the second identifier, to be allowed to receive the sponsored data connectivity, wherein the data connection comprises a sponsored data connection to the sponsored destination for use with the sponsored application; and at least one instruction for causing the computer to enable the sponsored application to access the sponsored destination using the sponsored data connection.

54. An apparatus, comprising:

means for sending a request for data connectivity to a data connection managing component, wherein the request identifies a destination associated with use of a sponsored application, the sponsored application is associated with an identifier, and the request comprises a first identifier of the destination and a second identifier of a wireless device, wherein the data connect managing component is configured to forward the request to a network entity that is associated with the identifier of the sponsored application to determine whether the destination is a sponsored destination for providing a sponsored data connectivity to the sponsored application;

means for establishing a data connection for accessing the destination in response to the request upon detecting that a response received from the network entity indicating that the destination is determined, based on the first identifier, to be the sponsored destination, and that the wireless device is determined, based on the second identifier, to be allowed to receive the sponsored data connectivity, wherein the data connection comprises a sponsored data connection to the sponsored destination for use with the sponsored application; and means for enabling the sponsored application to access the sponsored destination using the sponsored data connection.

55. An apparatus for requesting data connectivity, comprising:

a requestor component configured to send a request for data connectivity to a data connection managing component, wherein the request identifies a destination associated with use of a sponsored application, the sponsored application is associated with an identifier, and the request comprises a first identifier of the destination and a second identifier of a wireless device, wherein the data connect managing component is configured to forward the request to a network entity that is associated with the identifier of the sponsored application to determine whether the destination is a sponsored destination for providing a sponsored data connectivity to the sponsored application;

an access component configured to:

establish a data connection for accessing the destination in response to the request upon detecting that a response received from the network entity indicating that the destination is determined, based on the first identifier, to be the sponsored destination, and that the wireless device is determined, based on the second identifier, to be allowed to receive the sponsored data connectivity, the data connection comprises a sponsored data connection to the sponsored destination for use with the sponsored application; and enable the sponsored application to access the sponsored destination using the sponsored data connection.

56. The apparatus of claim 55, wherein the sponsored data connection comprises at least one of a third party paid for data connection, a free data connection, or a reduced charge data connection.

57. The apparatus of claim 55, further comprising presenting application status information for the sponsored application corresponding to the sponsored data connection.

58. The apparatus of claim 57, wherein the application status information comprises one of available sponsored data connection, an amount of data usage remaining for the sponsored data connection, or an available quota for the sponsored data connection.

59. The apparatus of claim 55, wherein the requestor component is further configured to receive a list of one or more available applications and a selection of the sponsored application from the list of one or more available applications, and forward an identification of the selected application with the request; and the presenting component is further configured to present the list of the one or more available applications.

60. The apparatus of claim 59, wherein the one more available applications comprise sponsored applications.

61. The apparatus of claim 55, wherein the presenting component is further configured to receive and present a quota expiration notification for the sponsored application, wherein the quota expiration notification is received when the maximum number of users or data has been used.

62. The apparatus of claim 55, wherein the data connection is established upon detecting that the second identifier of the wireless devices corresponds to an approved wireless device identification.

* * * * *